United States Patent
Bae et al.

(10) Patent No.: US 9,819,935 B2
(45) Date of Patent: Nov. 14, 2017

(54) IMAGE DATA COMPRESSION CONSIDERING VISUAL CHARACTERISTIC

(71) Applicant: Samsung Electronics Co., Ltd., Gyeonggi-do (KR)

(72) Inventors: Jong-Kon Bae, Seoul (KR); Dong-Kyoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 28 days.

(21) Appl. No.: 14/969,942

(22) Filed: Dec. 15, 2015

(65) Prior Publication Data
US 2016/0173886 A1    Jun. 16, 2016

(30) Foreign Application Priority Data
Dec. 15, 2014 (KR) .................. 10-2014-0180223

(51) Int. Cl.
| | | |
|---|---|---|
| *G06K 9/00* | (2006.01) | |
| *H04N 19/103* | (2014.01) | |
| *H04N 19/172* | (2014.01) | |
| *H04N 19/147* | (2014.01) | |

(52) U.S. Cl.
CPC ......... *H04N 19/103* (2014.11); *H04N 19/147* (2014.11); *H04N 19/172* (2014.11)

(58) Field of Classification Search
None
See application file for complete search history.

(56) References Cited

U.S. PATENT DOCUMENTS

| | | | | |
|---|---|---|---|---|
| 6,486,919 B1 * | 11/2002 | Kim | ............... | H04N 5/126 348/497 |
| 7,454,069 B2 * | 11/2008 | Kodama | ............... | G06T 1/0021 375/E7.048 |
| 7,580,019 B2 * | 8/2009 | Hong | ............... | G09G 3/2092 345/204 |
| 7,751,633 B1 * | 7/2010 | Mukherjee | ............... | H04N 19/176 382/166 |
| 7,983,494 B2 * | 7/2011 | Lee | ............... | H04N 19/593 358/426.02 |
| 7,991,238 B2 * | 8/2011 | Malvar | ............... | G06K 9/36 382/166 |
| 8,094,931 B2 * | 1/2012 | Chen | ............... | H04N 19/12 382/166 |
| 8,340,445 B2 * | 12/2012 | Yamaguchi | ............... | H04N 19/146 375/242 |
| 8,345,753 B2 * | 1/2013 | Lee | ............... | H04N 19/90 375/240.01 |
| 8,385,668 B2 * | 2/2013 | Furihata | ............... | H04N 19/186 345/204 |
| 8,600,179 B2 * | 12/2013 | Park | ............... | H04N 19/176 382/239 |
| 8,669,930 B2 * | 3/2014 | Kim | ............... | G09G 3/3614 345/204 |

(Continued)

*Primary Examiner* — Feng Niu
(74) *Attorney, Agent, or Firm* — The Farrell Law Firm, P.C.

(57) ABSTRACT

Disclosed is an image data compression method including calculating an estimated error of each of a plurality of compression modes for compressing image data based on the image data and a weighted value in each sub-pixel, selecting one mode among the plurality of compression modes based on the estimated error of each of the plurality of compression modes, and encoding the image data according to the selected mode.

51 Claims, 16 Drawing Sheets

(56) References Cited

U.S. PATENT DOCUMENTS

| | | | | |
|---|---|---|---|---|
| 8,811,484 B2* | 8/2014 | Motta | ............... | H04N 19/147 |
| | | | | 375/240.01 |
| 8,824,788 B2* | 9/2014 | Nam | ............... | H04N 19/176 |
| | | | | 382/166 |
| 8,861,879 B2* | 10/2014 | Park | ............... | H04N 19/176 |
| | | | | 382/239 |
| 8,879,838 B2* | 11/2014 | Park | ............... | H04N 19/176 |
| | | | | 382/165 |
| 9,071,838 B2* | 6/2015 | Cho | ............... | G09G 3/2092 |
| 9,100,661 B2* | 8/2015 | Alshina | ............... | H04N 19/61 |
| 2006/0139284 A1 | 6/2006 | Hong et al. | | |
| 2008/0231616 A1 | 9/2008 | Kim et al. | | |
| 2010/0142812 A1* | 6/2010 | Chen | ............... | H04N 19/12 |
| | | | | 382/166 |
| 2011/0058605 A1* | 3/2011 | Ma | ............... | H04N 19/176 |
| | | | | 375/240.02 |
| 2011/0206288 A1* | 8/2011 | Lee | ............... | H04N 19/597 |
| | | | | 382/233 |
| 2011/0243232 A1* | 10/2011 | Alshina | ............... | H04N 19/61 |
| | | | | 375/240.16 |
| 2012/0127188 A1 | 5/2012 | Furihata et al. | | |
| 2012/0195364 A1* | 8/2012 | Yi | ............... | H04N 19/103 |
| | | | | 375/240.02 |
| 2013/0243100 A1* | 9/2013 | Liu | ............... | H04N 19/105 |
| | | | | 375/240.25 |
| 2013/0272621 A1* | 10/2013 | Lasserre | ............... | G06T 9/00 |
| | | | | 382/233 |
| 2014/0092959 A1* | 4/2014 | Onno | ............... | H04N 19/00018 |
| | | | | 375/240.03 |
| 2016/0078851 A1* | 3/2016 | Asai | ............... | G09G 5/12 |
| | | | | 345/555 |

* cited by examiner

IMAGE DATA COMPRESSION CONSIDERING VISUAL CHARACTERISTIC

PRIORITY

This application claims priority under 35 U.S.C. §119(a) to Korean Application Serial No. 10-2014-0180223, which was filed in the Korean Intellectual Property Office on Dec. 15, 2014, the contents of which are incorporated herein by reference.

BACKGROUND

1. Field of the Disclosure

The present disclosure relates generally to image data compression and, more particularly, to image data compression by considering visual characteristics.

2. Description of the Related Art

Due to the proliferation of smart phones and tablet Personal Computers (PCs), as well as a high definition television (HDTV)-class ultra-high resolution display module, wide video graphics array (WVGA) grade and full-HD grade mobile displays have been developed.

There has been an increasing demand for portable terminals with a display module having high visibility, high speed, and small-size implementation.

As such, there is a need in the art for a technology which allows a user to be visually comfortable while using a compression technology indicating a compression rate in a hardware structure used in a portable terminal.

SUMMARY

The present disclosure has been made to address the above mentioned problems and disadvantages, and to provide at least the advantages described below.

Accordingly, an aspect of the present disclosure is to provide an image data compression method that considers visual characteristics.

In accordance with an aspect of the present disclosure, there is provided an image data compression method, including calculating an estimated error of each of a plurality of compression modes for compressing image data based on the image data and a weighted value in each sub-pixel, selecting one mode among the plurality of compression modes based on the estimated error of each of the plurality of compression modes, and encoding the image data according to the selected mode.

In accordance with another aspect of the present disclosure, there is provided a computer readable recording medium having recorded thereon a program for executing an image data compression method that includes calculating an estimated error of each of a plurality of compression modes for compressing image data based on the image data and a weighted value in each sub-pixel, selecting one mode among the plurality of compression modes based on the estimated error of each of the plurality of compression modes, and encoding the image data according to the selected mode.

In accordance with another aspect of the present disclosure, there is provided an image data compression apparatus, including an estimated error calculation module that calculates a compression error of each of a plurality of modes based on a compression estimation result of image data according to the plurality of modes for compressing image data and the image data, and calculates an estimated error of each of the plurality of modes based on a compression error of each of the plurality of modes and a weighted value in each pre-determined sub-pixel, a selection module that selects a mode among the plurality of the modes based on the estimated error, and an encoding module that encodes the image data compressed according to the selected mode.

In accordance with another aspect of the present disclosure, there is provided an image data compression method, including identifying a compression mode of image data included in encoding data based on the encoding data, and reconstructing the image data from the encoding data according to the identified compression mode.

In accordance with another aspect of the present disclosure, there is provided an image data reconstruction apparatus, including a storage medium which stores commands that are configured to perform at least one operation by at least one processor when being executed by the at least one processor, the at least one operation comprising identifying a compression mode of image data included in the encoding data based on an encoding data, and reconstructing the image data from the encoding data according to the identified compression mode.

In accordance with another aspect of the present disclosure, there is provided an image data reconstruction apparatus, including an identification module that identifies a compression mode of image data included in encoding data based on the encoding data, and a decoding module that reconstructs the image data from the encoding data according to the identified compression mode, wherein the decoding module restores a pixel value in which at least a part of the pixel value is truncated according to the identified mode, or copies a replacement pixel value included in at least a part of the encoding data as a pixel value of the image data.

In accordance with another aspect of the present disclosure, there is provided image data compression method, including compressing image data according to each of a plurality of compression modes for compressing the image data, calculating an estimated error of each of the modes based on a compression error of each of the modes and a weighted value in each sub-pixel, selecting one mode among the plurality of compression modes based on an estimated error of each of the plurality of compression modes, and encoding image data compressed according to the selected mode.

In accordance with another aspect of the present disclosure, there is provided image data compression method, including determining whether one mode among one or more lossless compression modes for compressing image data can be applied, selecting the one mode among the lossless compression modes when determining that the one mode among the plurality of lossless compression modes can be applied, calculating a compression error of the image data according to each of a plurality of lossy compression modes for compressing the image data when determining that one mode among the plurality of lossless compression modes cannot be applied, calculating an estimated error of each of the lossy compression modes based on the compression error and a weighted value in each sub-pixel, selecting one mode among the lossy compression modes based on the estimated error of each of the lossy compression modes, and encoding the image data according to the selected mode.

In accordance with another aspect of the present disclosure, there is provided an image data processing apparatus, including a compression apparatus, and a reconstruction apparatus connected to the compression apparatus, wherein the compression apparatus includes an estimated error calculation module that calculates a compression error of each of a plurality of modes based on a compression estimation result of image data according to the plurality of modes for compressing image data and the image data, and calculates an estimated error of each of the plurality of modes based on a compression error of each of the plurality of modes and a weighted value in each pre-determined sub-pixel, a selection module that selects a mode among the plurality of the modes based on the estimated error, and an encoding module that encodes the image data compressed according to the selected mode, and wherein the reconstruction apparatus includes an identification module that identifies a compression mode of image data included in encoding data based on the encoding data, and a decoding module that reconstructs the image data from the encoding data according to the identified mode.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
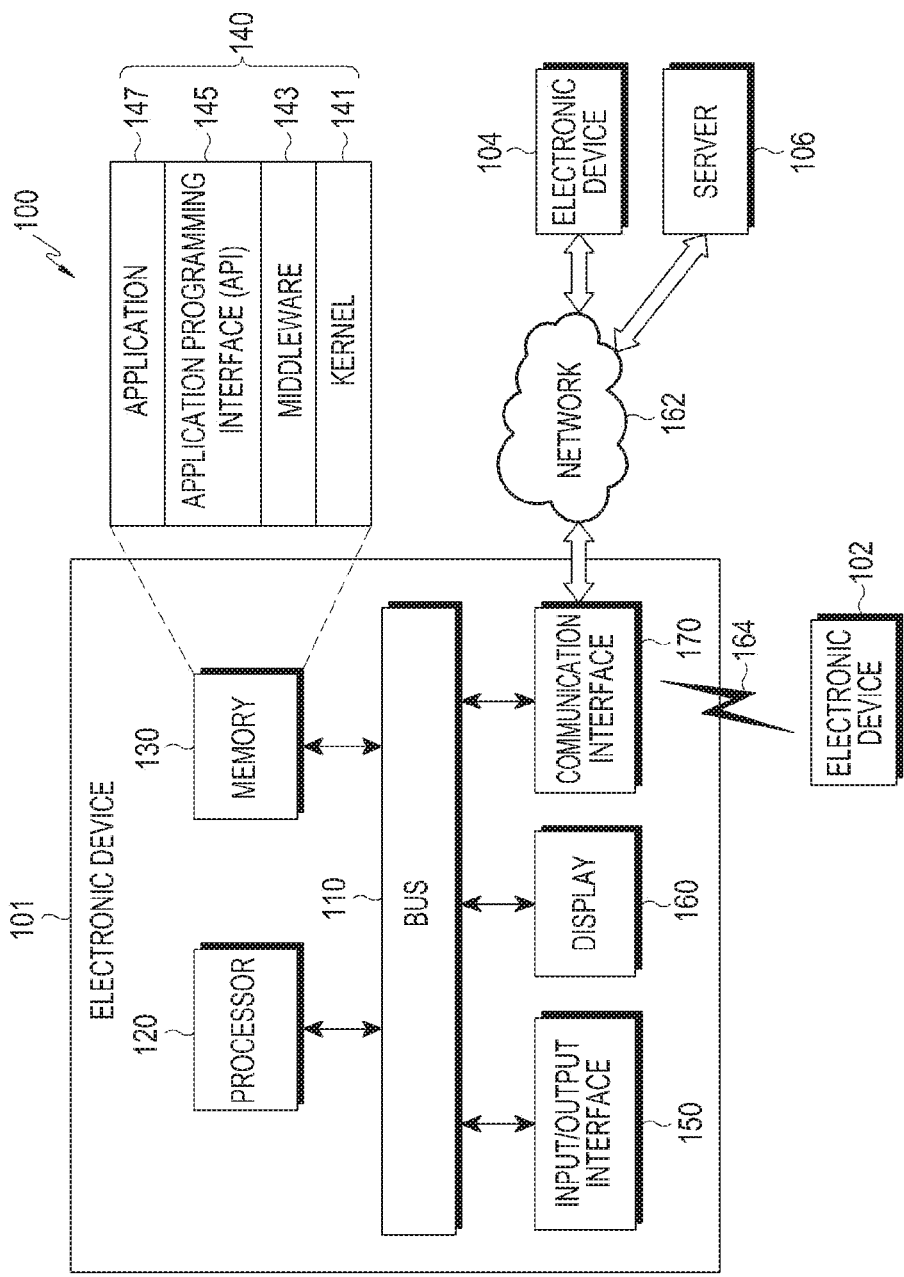
FIG. 1 is a block diagram of an electronic device according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. A detailed description of known functions and configurations will be omitted for the sake of clarity and conciseness.

As used herein, the expressions "have", "may have", "include", or "may include" refer to the existence of a corresponding feature such as numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in embodiments of the present disclosure may modify various components regardless of the order and/or the importance but does not limit the corresponding components. For example, a first user device and a second user device indicate different user devices although both of them are user devices. For example, a first element may be referred to as a second element, and similarly, a second element may be referred to as a first element without departing from the scope of the present disclosure.

When it is mentioned that one element such as a first element is "(operatively or communicatively) coupled with/to or connected to" another element such as a second element, it should be construed that the one element is directly connected to the another element or the one element is indirectly connected to the another element via yet another element such as a third element. In contrast, it will be understood that when the first element is referred to as being "directly connected," or "directly coupled" to the second element, there are no third element interposed between the first and second elements.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" indicates that the device, together with other devices or components, "is able to". For example, the phrase "processor adapted (or configured) to perform A, B, and C" indicates an embedded processor only for performing the corresponding operations or a generic-purpose processor such as central processing unit (CPU) or application processor (AP) that can perform the corresponding operations by executing one or more software programs stored in a memory device.

The terms used herein are merely for the purpose of describing particular embodiments and are not intended to limit the scope of other embodiments. As used herein, singular forms include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to embodiments of the present disclosure includes at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to embodiments, the wearable device includes at least one of an accessory type such as a watch, a ring, a bracelet, an anklet, a necklace, a glasses, a contact lens, or a head-mounted device (HMD), a fabric or clothing integrated type such as an electronic clothing, a body-mounted type such as a skin pad, or tattoo, and a bio-implantable type such as an implantable circuit.

According to some embodiments, the electronic device may be a home appliance such as a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box such as Samsung HomeSync™, Apple TV™, or Google TV™, a game console such as Xbox™ and PlayStation™, an electronic dictionary, an electronic key, a camcorder, and an electronic photo frame.

According to another embodiment, the electronic device includes at least one of various medical devices such as a blood glucose monitoring device, a heart rate monitoring device, a blood pressure measuring device, or a body temperature measuring device, a magnetic resonance angiography (MRA), a magnetic resonance imaging (MRI), a computed tomography (CT) machine, and an ultrasonic machine, a navigation device, a global positioning system (GPS) receiver, an event data recorder (EDR), a flight data recorder (FDR), a vehicle infotainment devices, electronic devices for a ship such as a navigation device and a gyro-compass, avionics, security devices, an automotive head unit, a robot for home or industry, an automatic teller machine (ATM) in businesses such as banks, point of sales (POS) devices in a shop, and Internet of Things (IoT) devices such as a light bulb, various sensors, electric or gas meter, a sprinkler device, a fire alarm, a thermostat, a streetlamp, a toaster, a sporting goods, a hot water tank, a heater, and a boiler.

According to some embodiments, the electronic device includes at least one of a part of furniture or a building/structure, an electronic board, an electronic signature receiving device, a projector, and various types of measuring instruments such as a water meter, an electric meter, a gas meter, and a radio wave meter. The electronic device according to embodiments of the present disclosure may be a combination of one or more of the aforementioned various devices, and may be a flexible device. The electronic device according to an embodiment of the present disclosure is not limited to the aforementioned devices, and may include a new electronic device according to the development of new technologies.

Hereinafter, an electronic device according to embodiments will be described with reference to the accompanying drawings. As used herein, the term "user" indicates a person or an artificial intelligence electronic device that uses an electronic device.

According to embodiments disclosed herein, a module compressing an image combines a lossless compression with block-unit image encoding.

In addition, an image compression means is provided, having virtually no visual loss by being classified by a sub-pixel and applying a weighted value which considers characteristics of a human's eye for a color or a brightness in each of the sub-pixels.

FIG. 1 illustrates is a block diagram of an electronic device according to embodiments of the present disclosure.

An electronic device 101 within a network environment 100, according to embodiments, will be described with reference to FIG. 1. The electronic device 101 includes a bus 110, a processor 120, a memory 130, an input/output interface 150, a display 160, and a communication interface 170. In some embodiments, the electronic device 101 may omit at least one of the above elements or further includes other elements.

The bus 110 includes a circuit which interconnects the elements 110 to 170 and delivers a communication such as a control message and/or data between the elements 110 to 170.

The processor 120 includes one or more of a central processing unit (CPU), an application processor (AP), and a communication processor (CP). The processor 120 performs operations or data processing relating to control and/or communication of at least one other element of the electronic device 101.

The memory 130 includes a volatile memory and/or a non-volatile memory. The memory 130 stores instructions or data relevant to at least one other element of the electronic device 101. According to an embodiment, the memory 130 stores software and/or a program 140 that includes a kernel 141, middleware 143, an application programming interface (API) 145, and/or application programs (or "applications") 147. At least some of the kernel 141, the middleware 143, and the API 145 may be referred to as an operating system (OS).

The kernel 141 controls and manages system resources such as the bus 110, the processor 120, or the memory 130 used for performing an operation or function implemented by the other programs such as the middleware 143, the API 145, or the application programs 147. The kernel 141 provides an interface through which the middleware 143, the API 145, or the application programs 147 may access the individual elements of the electronic device 101 to control or manage the system resources.

The middleware 143 functions as an intermediary for allowing the API 145 or the application programs 147 to communicate with the kernel 141 to exchange data.

In addition, the middleware 143 processes one or more task requests received from the application programs 147 according to priorities thereof. For example, the middleware 143 may assign priorities for using the system resources such as the bus 110, the processor 120, and the memory 130 of the electronic device 101, to at least one of the application programs 147. For example, the middleware 143 performs scheduling or load balancing on the one or more task requests by processing the one or more task requests according to the priorities assigned thereto.

The API 145 is an interface through which the applications 147 control functions provided from the kernel 141 or the middleware 143, and includes, for example, at least one interface or function such as an instruction for file control, window control, image processing, or text control.

The input/output interface 150 is an interface that transfers instructions or data input from a user or another external device to the other element(s) of the electronic device 101. The input/output interface 150 outputs the instructions or data received from the other element(s) of the electronic device 101 to the user or another external device.

Examples of the display 160 include a liquid crystal display (LCD), a light-emitting diode (LED) display, an organic light-emitting diode (OLED) display, microelectromechanical systems (MEMS) display, and an electronic paper display. The display 160 displays various types of content such as text, images, videos, icons, or symbols for the user. The display 160 includes a touch screen and receives, for example, a touch, gesture, proximity, or hovering input using an electronic pen or the user's body part.

The communication interface 170 sets communication between the electronic device 101 and an external device, such as the first external electronic device 102, the second external electronic device 104, or a server 106. For example, the communication interface 170 may be connected to a network 162 through wireless or wired communication to communicate with the external device.

The wireless communication uses at least one of long term evolution (LTE), LTE-advanced (LTE-A), code division multiple access (CDMA), wideband CDMA (WCDMA), universal mobile telecommunications system (UMTS), wibro (Wireless Broadband), and global system for mobile communications (GSM), as a cellular communication protocol. In addition, the wireless communication includes short-range communication 164 such as wireless fidelity (WiFi), BT, near field communication (NFC), and global positioning system (GPS). The wired communication includes at least one of a universal serial bus (USB), a high definition multimedia interface (HDMI), recommended standard 232 (RS-232), and a plain old telephone service (POTS). The network 162 includes at least one of a communication network such as a computer network such as a local area network (LAN) or a wide area network (WAN), the Internet, and a telephone network.

Each of the first and second external electronic apparatuses 102 and 104 may be of a type identical to or different from that of the electronic apparatus 101. According to an embodiment, the server 106 includes a group of one or more servers. According to embodiments, all or a part of operations executed in the electronic device 101 may be executed in one or multiple other electronic devices. According to an embodiment, when the electronic device 101 has to perform some functions or services automatically or in response to a request, the electronic device 101 makes a request for performing at least some functions relating thereto to another device, such as the electronic device 102 or 104 or the server 106, which executes the requested functions or the additional functions, and delivers a result of the execution to the electronic apparatus 101. The electronic device 101 processes the received result as it is or additionally to provide the requested functions or services. To achieve this, for example, cloud computing, distributed computing, or client-server computing technology may be used.

Figure 2:
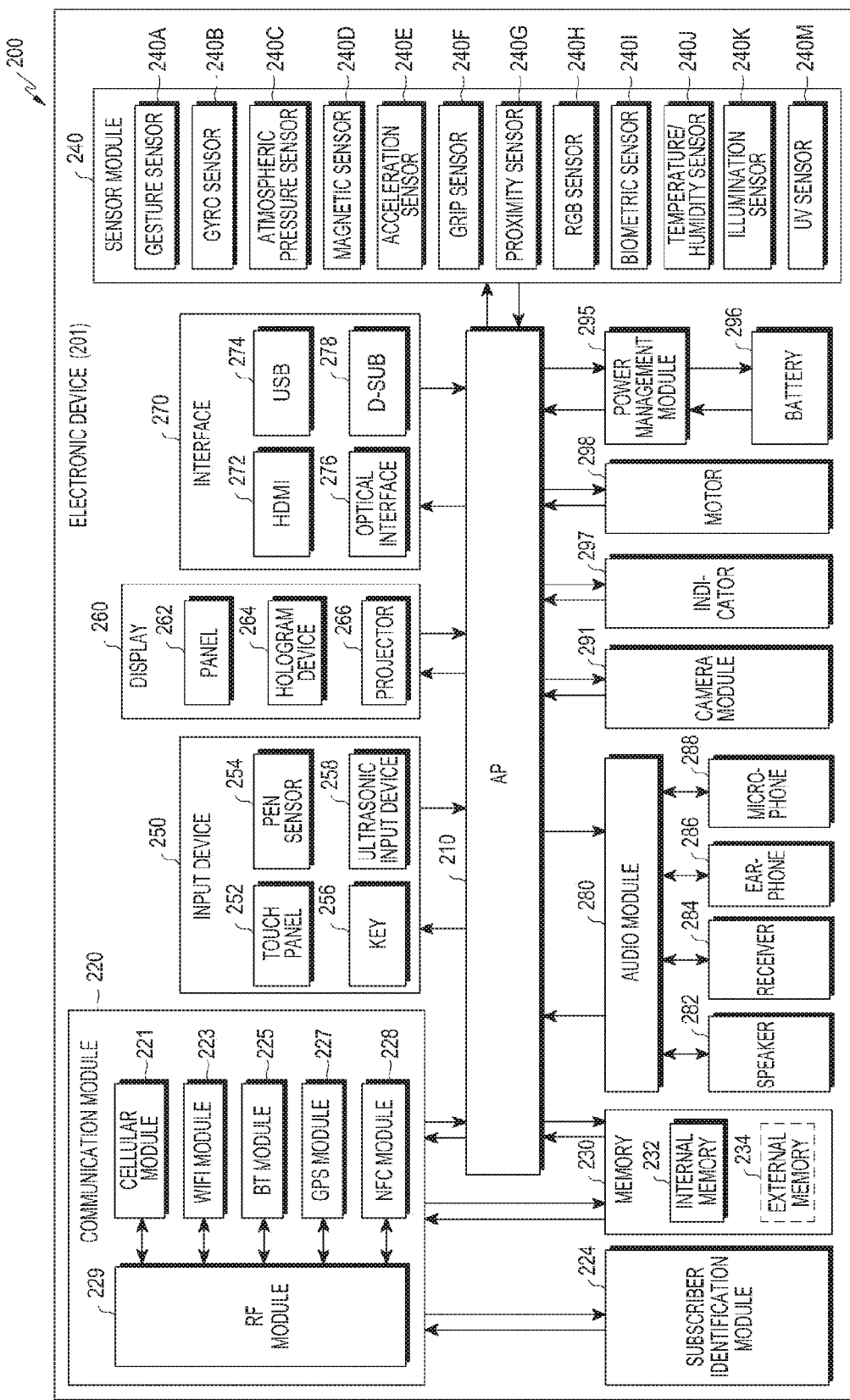
FIG. 2 is a block diagram of an electronic device according to embodiments of the present disclosure.

FIG. 2 is a block diagram of an electronic device 201 according to embodiments of the present disclosure. The electronic apparatus 201 includes all or part of the electronic apparatus 101 illustrated in FIG. 1. The electronic device 201 includes at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 controls a plurality of hardware or software components connected to the processor 210 by driving an operating system or an application program and performs processing of various pieces of data and calculations. The processor 210 may be implemented by a system on chip (SoC). According to an embodiment, the processor 210 further includes a graphic processing unit (GPU) and/or an image signal processor. The processor 210 includes at least some of the elements illustrated in FIG. 2. The processor 210 loads, into a volatile memory, instructions or data received from at least a non-volatile memory of the other elements and processes the loaded instructions or data, and stores various data in a non-volatile memory.

The communication module 220 may have the same or a similar configuration to that of the communication interface 170 of FIG. 1. The communication module 220 includes a cellular module 221, a Wi-Fi module 223, a BT module 225, a GPS module 227, an NFC module 228, and a radio frequency (RF) module 229.

The cellular module 221 provides a voice call, an image call, a text message service, or an Internet service through a communication network. According to an embodiment, the cellular module 221 distinguishes between and authenticate electronic devices 201 within a communication network using a SIM card 224. According to an embodiment of the present disclosure, the cellular module 221 performs at least some of the functions that the processor 210 provides, and the cellular module 221 includes a communication processor (CP).

For example, each of the Wi-Fi module 223, the Bluetooth (BT)™ module 225, the GPS module 227, and the NFC module 228 includes a processor for processing data transmitted/received through the corresponding module, and at least two of these modules may be included in one integrated chip (IC) or IC package.

The RF module 229 transmits/receives a communication signal such as an RF signal. The RF module 229 includes, for example, a transceiver, a power amp module (PAM), a frequency filter, a low noise amplifier (LNA), or an antenna. According to another embodiment, at least one of the cellular module 221, the WiFi module 223, the BT module 225, the GPS module 227, and the NFC module 228 transmits/receives an RF signal through a separate RF module.

The SIM 224 includes a subscriber identity module and/or an embedded SIM, and includes unique identification information such as an integrated circuit card identifier (ICCID) or subscriber information such as an international mobile subscriber identity (IMSI).

The memory 230 includes, for example, an internal memory 232 and an external memory 234. The embedded memory 232 includes at least one of a volatile memory including a dynamic random access memory (DRAM), a static RAM (SRAM), and a synchronous dynamic RAM (SDRAM), and a non-volatile memory including a one time programmable read only memory (OTPROM), a programmable ROM (PROM), an erasable and programmable ROM (EPROM), an electrically erasable and programmable ROM (EEPROM), a mask ROM, a flash ROM, a flash memory such as a NAND flash memory or a NOR flash memory, a hard disc drive, and a solid state drive (SSD).

The external memory 234 further includes a flash drive such as a compact flash (CF), a secure digital (SD), a micro secure digital (Micro-SD), a mini secure digital (Mini-SD), an eXtreme digital (xD), multimedia card (MMC), and a memory stick. The external memory 234 may be functionally and/or physically connected to the electronic device 201 through various interfaces.

The sensor module 240 measures a physical quantity or detect an operation state of the electronic device 201, and converts the measured or detected information into an electrical signal. The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H such as a red, green, blue (RGB) sensor, a biometric sensor 240I, a temperature/humidity sensor 240J, a light sensor 240K, and an ultraviolet (UV) sensor 240M. Additionally or alternatively, the sensor module 240 includes an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 further includes a control circuit for controlling one or more sensors included therein. The electronic device 201 further includes a processor configured to control the sensor module 240 as a part of or separately from the processor 210, and controls the sensor module 240 while the processor 210 is in a sleep state.

The input device 250 includes, for example, a touch panel 252, a (digital) pen sensor 254, a key 256, or an ultrasonic input device 258. The touch panel 252 uses at least one of a capacitive, resistive, infrared, and ultrasonic type, includes a control circuit, and further includes a tactile layer that provides a tactile reaction to the user.

The (digital) pen sensor 254 includes a recognition sheet which is a part of the touch panel or is separated from the touch panel. The key 256 includes a physical button, an optical key or a keypad, for example. The ultrasonic input device 258 detects ultrasonic wavers generated by an input tool through a microphone 288 and identifies data corresponding to the detected ultrasonic waves.

The display 260 includes a panel 262, a hologram device 264 and a projector 266. The panel 262 includes a configuration identical or similar to that of the display 160 illustrated in FIG. 1, and is flexible, transparent, and/or wearable. The panel 262 and the touch panel 252 may be implemented as one module. The hologram 264 displays a three dimensional image in the air by using an interference of light. The projector 266 displays an image by projecting light onto a screen. The screen may be located, for example, inside or outside the electronic device 201. According to an embodiment, the display 260 further includes a control circuit for controlling the panel 262, the hologram device 264, or the projector 266.

The interface 270 includes a high-definition multimedia interface (HDMI) 272, a universal serial bus (USB) 274, an optical interface 276, and a D-subminiature (D-sub) 278. The interface 270 may be included in the communication interface 170 illustrated in FIG. 1. Additionally or alternatively, the interface 270 includes a mobile high-definition link (MHL) interface, a secure digital (SD) card/multi-media card (MMC) interface, or an infrared data association (IrDA) standard interface.

The audio module 280 bilaterally converts a sound and an electrical signal. At least some elements of the audio module 280 may be included in the input/output interface 145 illustrated in FIG. 1. The audio module 280 processes sound information which is input or output through, for example, a speaker 282, a receiver 284, earphones 286, or the microphone 288.

The camera module 291 photographs a still image and a dynamic image. According to an embodiment, the camera module 291 includes one or more image sensors, a lens, an image signal processor (ISP) or a flash such as a light emitting diode (LED) or xenon lamp.

The power management module 295 manages power of the electronic device 201. According to an embodiment, the power management module 295 includes a power management integrated circuit (PMIC), a charger integrated circuit (IC), or a battery gauge. The PMIC uses a wired and/or wireless charging method. Examples of the wireless charging method include a magnetic resonance, a magnetic induction, and an electromagnetic method. Additional circuits such as a coil loop, a resonance circuit, and a rectifier for wireless charging may be further included. The battery gauge measures a residual quantity of the battery 296, and a voltage, a current, or a temperature during the charging. The battery 296 includes a rechargeable battery or a solar battery.

The indicator 297 displays a particular state such as a booting, message, or charging state of the electronic apparatus 201 or a part such as the processor 210) of the electronic apparatus 2201. The motor 298 converts an electrical signal into mechanical vibration, and generates vibration, a haptic effect. Although not illustrated, the electronic apparatus 201 includes a processing unit such as a graphics processing unit (GPU) for supporting a mobile television (TV). The processing unit for supporting mobile TV may, for example, process media data according to a certain standard such as digital multimedia broadcasting (DMB), digital video broadcasting (DVB), or media forward link only (mediaFLO)™.

Each of the above-described component elements of hardware according to the present disclosure may be configured with one or more components, and the names of the corresponding component elements may vary based on the type of electronic device. The electronic device according to embodiments of the present disclosure includes at least one of the aforementioned elements. Some elements may be omitted or other additional elements may be further included in the electronic device. Some of the hardware components according to embodiments may be combined into one entity, which performs functions identical to those of the relevant components before the combination.

Figure 3:
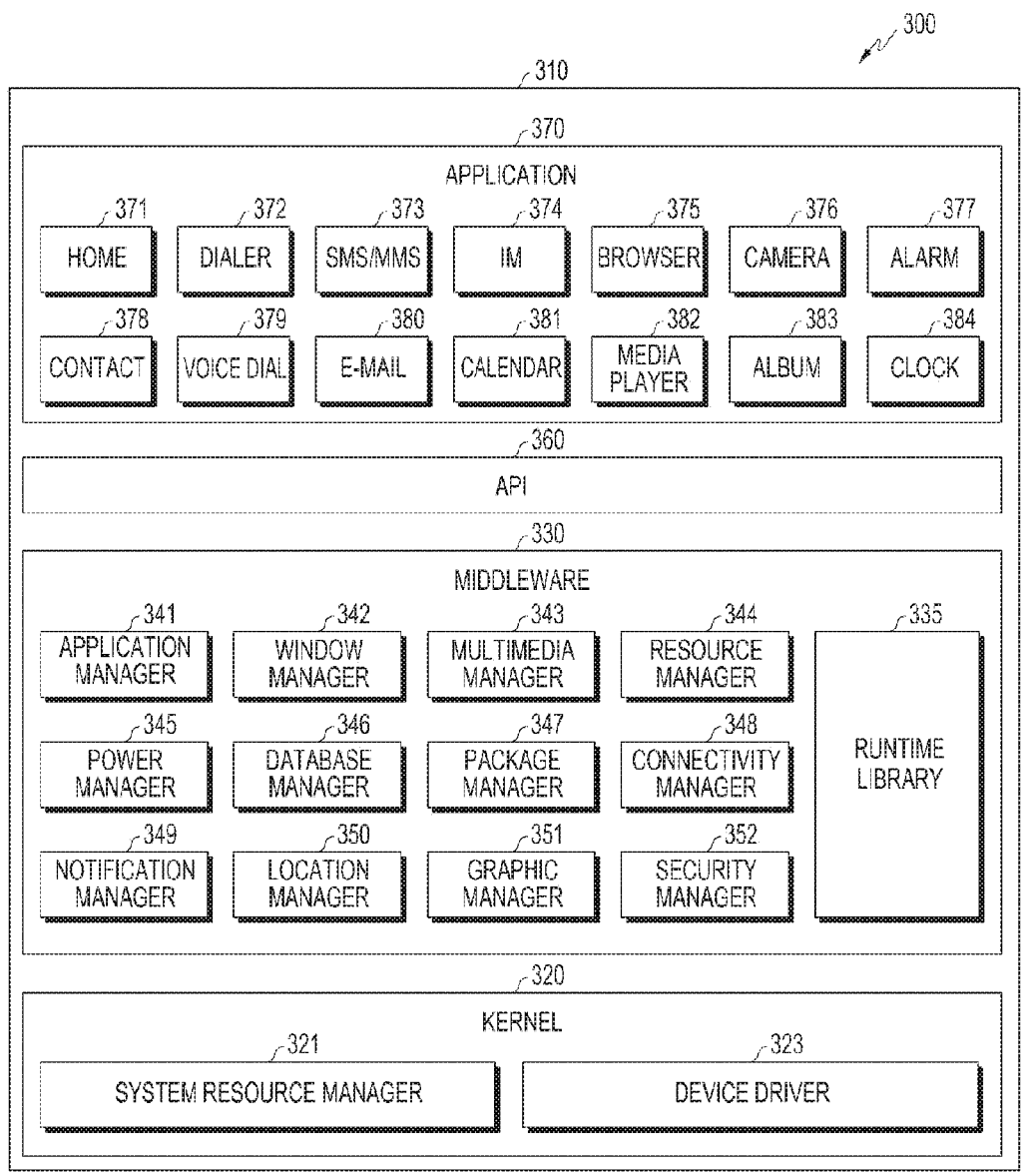
FIG. 3 is a block diagram of a program module according to embodiments of the present disclosure.

FIG. 3 is a block diagram of a program module according to embodiments of the present disclosure. In FIG. 3, the program module 310 includes an operating system (OS) for controlling resources related to the electronic device and/or various applications executed in the operating system. The operating system may be, for example, Android, iOS, Windows, Symbian, Tizen, or Bada.

The program module 310 includes a kernel 320, middleware 330, an application programming interface (API) 360, and/or an application 370. At least some components of the program module 310 may be preloaded on the electronic apparatus, or may be downloaded from an external electronic apparatus.

The kernel 320 includes, for example, a system resource manager 321 and/or a device driver 323. The system resource manager 321 performs the control, allocation, or retrieval of system resources. According to an embodiment of the present disclosure, the system resource manager 321 includes a process management unit, a memory management unit, and a file system management unit. The device driver 323 includes, for example, a display driver, a camera driver, a BT driver, a shared memory driver, a USB driver, a keypad driver, a Wi-Fi driver, an audio driver, or an inter-process communication (IPC) driver.

The middleware 330 provides a function required by the applications 370 in common or provides various functions to the applications 370 through the API 360 so that the applications 370 can efficiently use limited system resources within the electronic device. According to an embodiment, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that a compiler uses in order to add a new function through a programming language while the applications 370 are being executed. The runtime library 335 performs input/output management, memory management, and the functionality for an arithmetic function.

The application manager 341 manages the life cycle of at least one of the applications 370. The window manager 342 manages graphical user interface (GUI) resources used for the screen. The multimedia manager 343 determines a format required to reproduce various media files, and encodes or decodes a media file by using a coder/decoder (codec) appropriate for the corresponding format. The resource manager 344 manages resources, such as a source code, a memory, and a storage space of at least one of the applications 370.

The power manager 345 operates together with a basic input/output system (BIOS) to manage a battery or power and provides power information required for operating the electronic device. The database manager 346 generates, searches for, and/or changes a database to be used by at least one of the applications 370. The package manager 347 manages the installation or update of an application distributed in the form of a package file.

The connectivity manager 348 manages a wireless connection such as, for example, Wi-Fi or BT. The notification manager 349 displays or notifies of an event, such as an arrival message, an appointment, and a proximity notification, in a manner that does not disturb the user. For example, when an event occurs, the event is notified by executing a background screen. The location manager 350 manages location information of the electronic device. The graphic manager 351 manages a graphic effect, which is to be provided to the user, or a user interface related to the graphic effect. The security manager 352 provides various security functions required for system security, and user authentication. According to an embodiment of the present disclosure, when the electronic device has a telephone call function, the middleware 330 further includes a telephony manager for managing a voice call function or a video call function of the electronic device.

The middleware 330 includes a middleware module that forms a combination of various functions of the above-described elements. The middleware 330 provides a module specialized in each type of OS in order to provide a differentiated function, and dynamically deletes some of the existing elements, or adds new elements.

The API 360 is, for example, a set of API programming functions, and may be provided with a different configuration according to an OS. For example, in Android or iOS, one API set may be provided for each platform. In Tizen, two or more API sets may be provided for each platform.

The applications 370 include one or more applications which can provide functions such as home 371, dialer 372, SMS/MMS 373, instant message (IM) 374, browser 375, camera 376, alarm 377, contacts 378, voice dialer 379, email 380, calendar 381, media player 382, album 383, clock 384, health care such as measuring exercise quantity or blood sugar level, and environment information such as atmospheric pressure, humidity, or temperature information.

According to an embodiment of the present disclosure, the applications 370 includes an application (hereinafter, an "information exchange application") supporting information exchange between the electronic device and an external electronic device. The application associated with the exchange of information includes, for example, a notification relay application for transferring specific information to an external electronic device or a device management application for managing an external electronic device.

For example, the notification relay application includes a function of transferring, to the external electronic device, notification information generated from other applications of the electronic device 101, an SMS/MMS, e-mail, health management, or environmental information application. The notification relay application receives notification information from, for example, an external electronic device and provides the received notification information to a user.

The device management application manages a function for at least a part of the external electronic device communicating with the electronic device, such as turning on/off all or part of the external electronic device or adjusting brightness or resolution of a display, applications executed in the external electronic device, or services provided from the external electronic device such as a telephone call service or a message service.

According to an embodiment, the applications 370 are designated according to attributes of the external electronic device 102 or 104. According to an embodiment of the present disclosure, the applications 370 include an application received from the external electronic apparatus. According to an embodiment of the present disclosure, the applications 370 include a preloaded application or a third party application which can be downloaded from the server. Names of the elements of the program module 310, according to the above-described embodiments of the present disclosure, may change depending on the type of OS.

According to various embodiments of the present disclosure, at least some components of the program module 310 may be implemented in software, firmware, hardware, or a combination of two or more thereof. At least some components of the program module 310 may be implemented by the processor. At least some components of the program module 310 includes, for example, a module, a program, a routine, a set of instructions, and/or a process for performing one or more functions.

The term "module" as used herein may, for example, indicate a unit including one of hardware, software, and firmware or a combination of two or more of them. The "module" may be interchangeably used with, for example, the terms "unit", "logic", "logical block", "component", and "circuit". The "module" may be a minimum unit of an integrated component element or a part thereof. The "module" may be a minimum unit for performing one or more functions or a part thereof. The "module" may be mechanically or electronically implemented, such as by including at least one of an application-specific integrated circuit (ASIC) chip, a field-programmable gate arrays (FPGA), and a programmable-logic device for performing known operations or future-developed operations.

According to embodiments, modules or functions of the devices or the method according to the present disclosure may be implemented by a command stored in a computer-readable storage medium in a programming module form. The instruction, when executed by a processor, may cause the one or more processors to execute the function corresponding to the instruction. The computer-readable storage medium may be, for example, the memory 130.

The computer readable recoding medium includes a hard disk, a floppy disk, magnetic media such as a magnetic tape), optical media such as a compact disc read only memory (CD-ROM) and a digital versatile disc (DVD)), magneto-optical media such as a floptical disk, a hardware device such as a read only memory (ROM), a random access memory (RAM), and a flash memory. In addition, the program instructions includes high class language codes, which can be executed in a computer by using an interpreter, as well as machine codes made by a compiler. The aforementioned hardware device may be configured to operate as one or more software modules in order to perform operations of the present disclosure, and vice versa.

The programming module according to the present disclosure includes one or more of the aforementioned components or further includes other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added.

Figure 4:
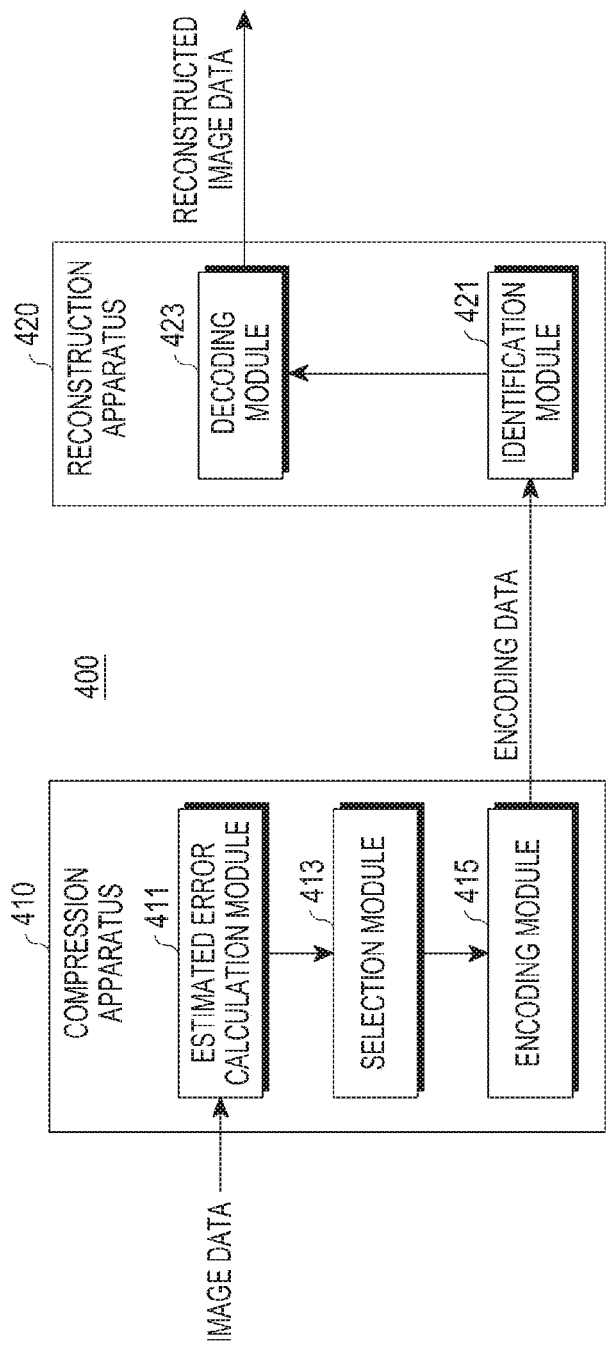
FIG. 4 illustrates a configuration of a part of an image data processing apparatus according to embodiments of the present disclosure.

FIG. 4 illustrates a configuration of a part of an image data processing apparatus according to embodiments of the present disclosure. An image data processing apparatus 400 may be, for example, an electronic device 101 as shown in FIG. 1. Referring to FIG. 4, the image data processing apparatus 400 includes at least one of a compression apparatus 410 or a reconstruction apparatus 420.

According to embodiments, the compression apparatus 410 selects a suitable compression mode by receiving image data. The compression apparatus 410 generates encoding data and then outputs the generated data. According to an embodiment, the reconstruction apparatus 420 receives an input of the encoding data and reconstruct image data from the encoding data. The compression apparatus 410 and the reconstruction apparatus 420 are connected through various wired/wireless communication lines. For example, when the compression apparatus 410 and the reconstruction apparatus 420 are implemented to be included in one apparatus, the communication line corresponds to a communication line in a high-speed serial interface or other high-speed serial scheme defined by a mobile industry processor interface (MIPI). The compression apparatus 410 and the reconstruction apparatus 420 are connected through various wireless display interfaces.

According to embodiments, the compression apparatus 410 includes an estimated error calculation module 411, a selection module 413, and an encoding module 415.

According to an embodiment, the compression apparatus 410 compresses image data selectively using a scheme, which is suitable for the image data, among various image compression schemes. Video compression schemes for compressing the image data may be represented by a plurality of compression modes. The estimated error calculation module 411 calculates each estimated error which can be generated with respect to at least some of the plurality of compression modes supported by the compression apparatus 410. The estimated error may be a compression error due to a loss which can be generated when the image data is compressed in accordance with the plurality of compression modes. For example, the compression error corresponds to a difference between a compression estimated result and the image data before the compression according to the plurality of compression modes.

The estimated error calculation module 411 calculates the estimated error of the plurality of compression modes, based on the compression error and a predetermined weighted value in each a sub-pixel. The estimated error calculation module 411 generates reconstruction data after the estimated compression of the image data according to each of the plurality of compression modes, and calculates an estimated error of the plurality of the compression modes based on the reconstruction data and the image data.

The selection module 413 selects a compression mode to be used to compress the image data based on the estimated error of each of the compression mode among the plurality of compression modes. The compression mode includes a lossless compression mode, which can compress so as to enable the image data to be reconstructed as original image data, or a lossy compression such as a visual lossless compression mode in which damage of an image quality may be generated in comparison to the original image data. An image compression method according to each mode will be described below.

The selection module 413 first determines whether the lossless compression mode may be applied. The selection module 413 determines or selects which compression mode is to be used among the plurality of lossy compression modes or the plurality of lossless compression modes.

The encoding module 415 encodes the image data according to the selected compression mode. The encoding module 415 compresses the image data according to the selected compression mode and generates the compressed image data and encoding data including an identifier such as an operation (OP) code which represents a compression mode. Compressing the image data by the encoding module 415 includes truncating at least a part of a pixel value included in the image data or replacing at least a part of the pixel value included in the image data with another value, and replacing the at least a part of the pixel value is performed based on an average of the at least a part of the pixel value.

The reconstruction apparatus 420 includes an identification module 421 and a decoding module 423. The reconstruction apparatus 420 outputs reconstructed image data by receiving the encoded data generated by the compression apparatus 410.

The identification module 421 identifies a compression mode of image data included in the encoding data based on encoding data encoded by the compression apparatus 410. The identification module 421 determines an identifier such as the OP code included in the encoding data in order to identify the compression mode.

The decoding module 423 reconstructs the image data from the encoding data according to the identified compression mode. For example, the decoding module 423 recognizes a pattern corresponding to the identified compression mode, reconstructs at least a part of the pixel value which is truncated according to the identified compression mode by considering the recognized pattern, and copies a pixel value included in at least the part of the encoding data as a pixel value of the image data.

Figure 5:
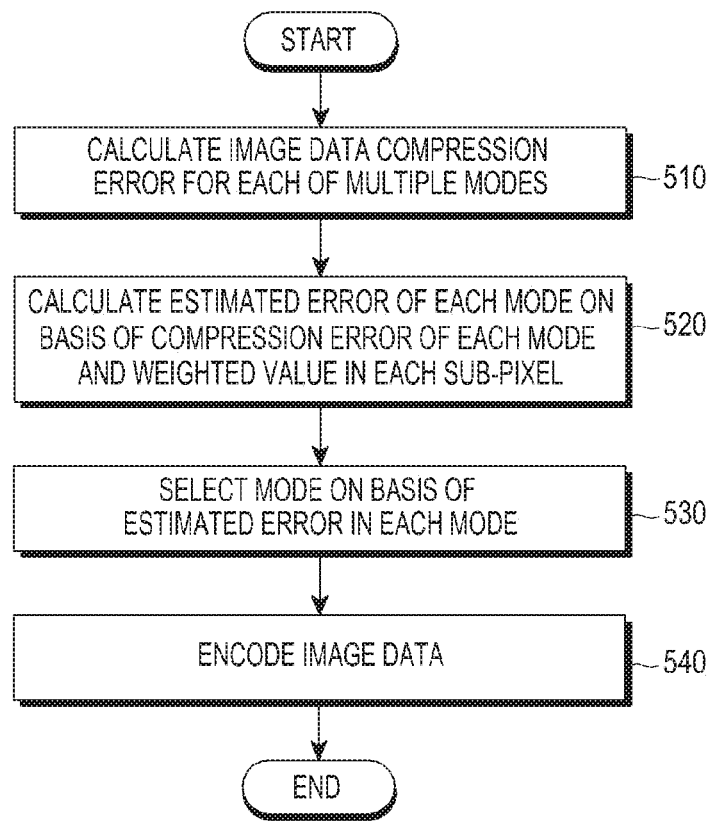
FIG. 5 is a flowchart of an image data compression method according to embodiments of the present disclosure.

FIG. 5 is a flowchart of an image data compression method according to embodiments of the present disclosure.

In step 510, a compression apparatus receives image data and calculates a compression error of the image data according to each of the plurality of compression modes for compressing the received image data. The received image data may be a part of an entire image, and includes one or more pixels in an image frame. According to an embodiment, the image data may be pixel data corresponding to a pixel block.

In step 520, the compression apparatus calculates an estimated error of each of the modes based on the image data and a weighted value in each sub-pixel.

In step 530, the compression apparatus selects a mode among the modes based on an estimated error in each mode.

In step 540, the compression apparatus encodes the image data according to the selected mode.

Figure 6:
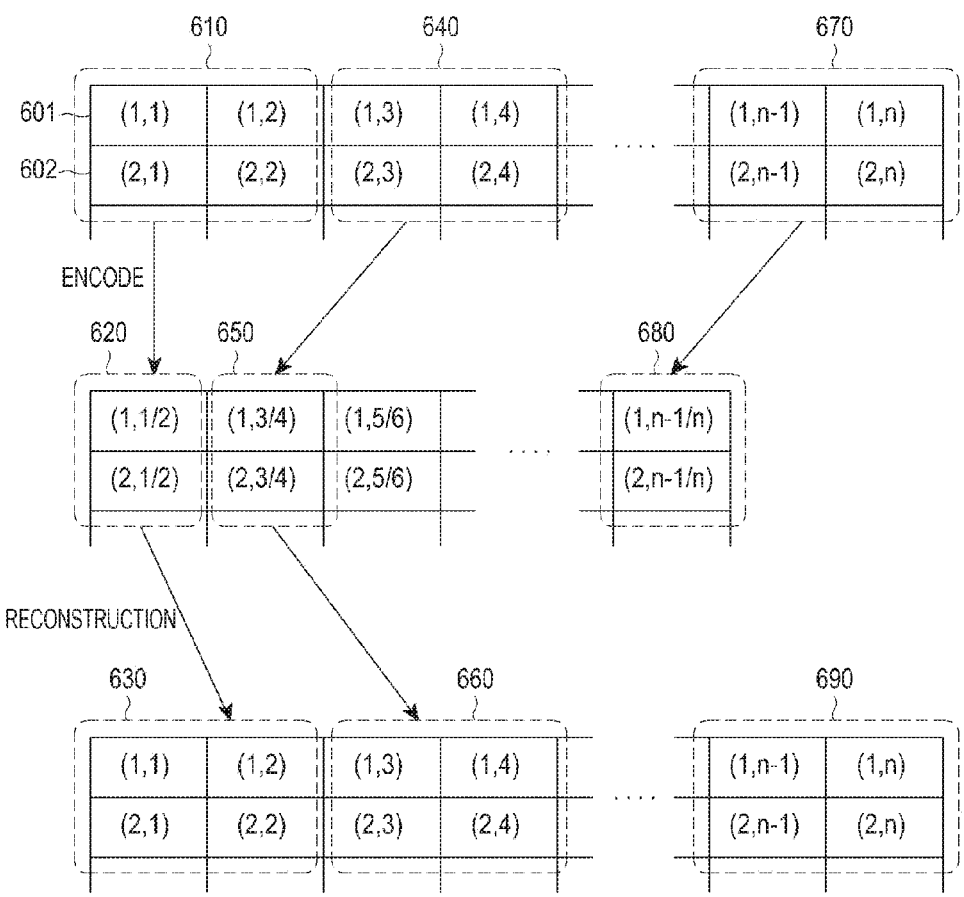
FIG. 6 illustrates an encoding and reconstruction operation for image data according to embodiments of the present disclosure.

FIG. 6 illustrates an encoding and reconstruction operation for image data according to embodiments of the present disclosure.

Referring to FIG. 6, image data corresponds to a part of an entire image and a compression apparatus receives image data 610, which is data to be currently processed, as an input. Following image data such as image data 640 and image data 670 are continuously received.

The image data 610 may be received in a block form including a plurality of pixels. The image data 610 includes a plurality of pixels belonging to different lines in the image. For example, the image data 610 includes a plurality of pixels such as (1, 1) and (1, 2)) included in a first row 601 and a plurality of pixels such as (2, 1) and (2, 2)) included in a second row 602. In addition, the image data 610 in FIG. 6 includes four pixels input, for example, in a 2×2 pixel array form or a block form. The pixel array form or block form in FIG. 6 is only an example and the technique disclosed in the document is not limited thereto.

The compression apparatus generates encoding data smaller than a size of original image data 610 by compressing the image data 610. For example, the image data 610, 640, and 670 corresponding to a size of four pixels can be encoded as encoding data 620, 650, and 680 corresponding to a size of two pixels by the compression apparatus, respectively. The image data 610, 640, and 670 may be reconstructed as reconstruction data 630, 660, and 690 corresponding to a size of four pixels by the reconstruction apparatus.

Figure 7:
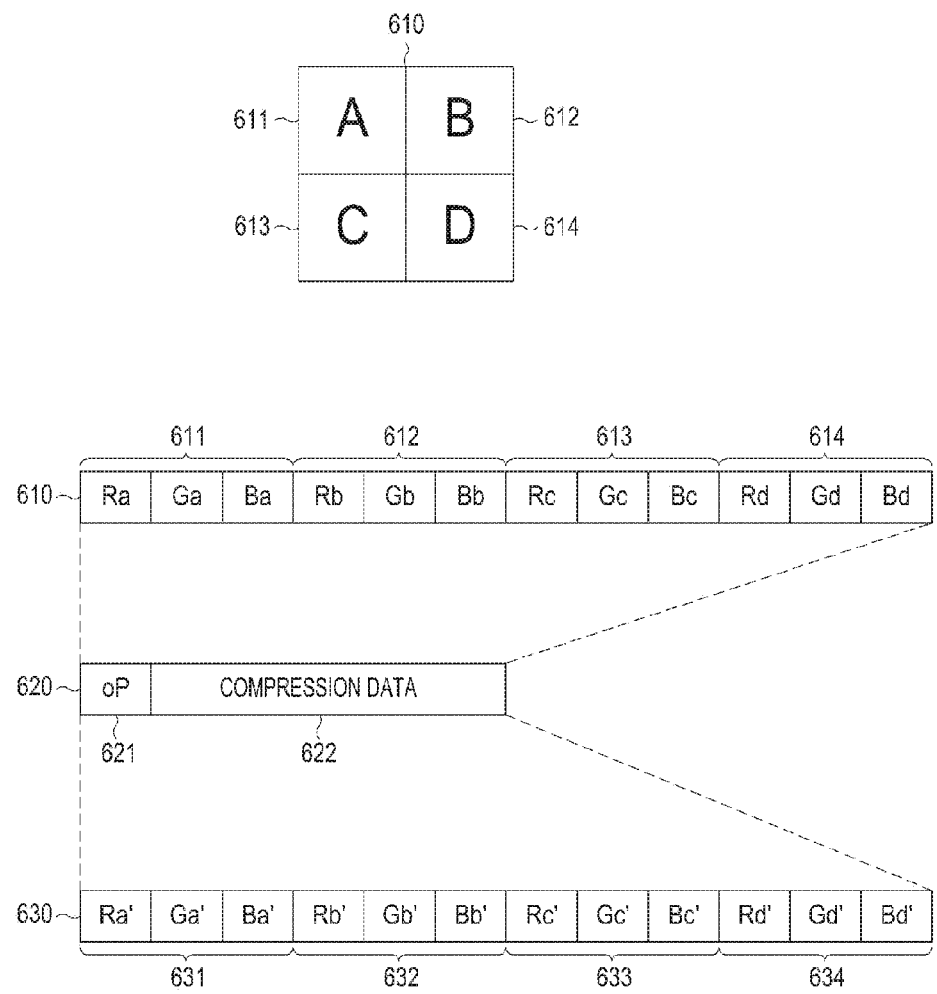
FIG. 7 illustrates a data form used in an encoding and reconstruction process according to embodiments of the present disclosure.

FIG. 7 illustrates a data form used in encoding and reconstruction processes according to embodiments of the present disclosure.

Referring to FIG. 7, a compression apparatus receives image data 610 corresponding to a part of data in an image as shown in FIG. 6. The image data 610 received by the compression apparatus includes pixels A 611, B 612, C 613, and D 614. Each of the pixels may be expressed as a sub-pixel value distinguished as R, G, and B. For example, pixel A 611, pixel B 612, pixel C 613, and pixel D 614 may expressed as sub-pixels Ra/Ga/Ba, sub-pixels Rb/Gb/Bb, sub-pixels Rc/Gc/Bc, and sub-pixels Rd/Gd/Bd, respectively. For example, when each sub-pixel has a size of 8 bits, each of the pixels have a size of 24 bits and the image data 610 have a size of 96 bits.

Encoding data 620 which is generated by compressing and encoding the current image data 610 by the compression apparatus have a specific size. For example, a compression apparatus having a fixed compression ratio generates encoding data 620 of a specified size such as 32 bits, 48 bits, or 72 bits. When the specified size is 48 bits, the fixed compression ratio is 50%. The fixed compression ratio of 50% is only an example, and the present disclosure is not limited thereto. The compression apparatus 410 also generates the encoding data 620 at different ratios such as 33% or 75%.

The compression apparatus generates the encoding data 620 including an indicator 621 such as an OP code) and a compression data 622. The compression apparatus selects a compression mode suitable for current image data, compresses the current image data according to the selected compression mode, and generates the encoding data 620. The indicator 621 included in the encoding data 620 includes information on the compression mode selected by the compression apparatus. The compression data 622 includes a compression result of the image data 610 according to the selected compression mode.

A reconstruction apparatus generates the reconstruction data 630 having a size of 96 bits identical to a size of a first image data 610 based on the encoding data 620. The reconstruction data 630 includes new pixel data A' 631, B' 632, C' 633, or D' 634 corresponding to each of four pixels 611, 612, 613 and 614. The pixels A' 631, B' 632, C' 633, or D' 634 in the reconstruction data 630 include reconstructed sub-pixels Ra'/Ga'/Ba', Rb'/Gb'/Bb', Rc'/Gc'/Bc', and Rd'/Gd'/Bd'.

Figure 8:
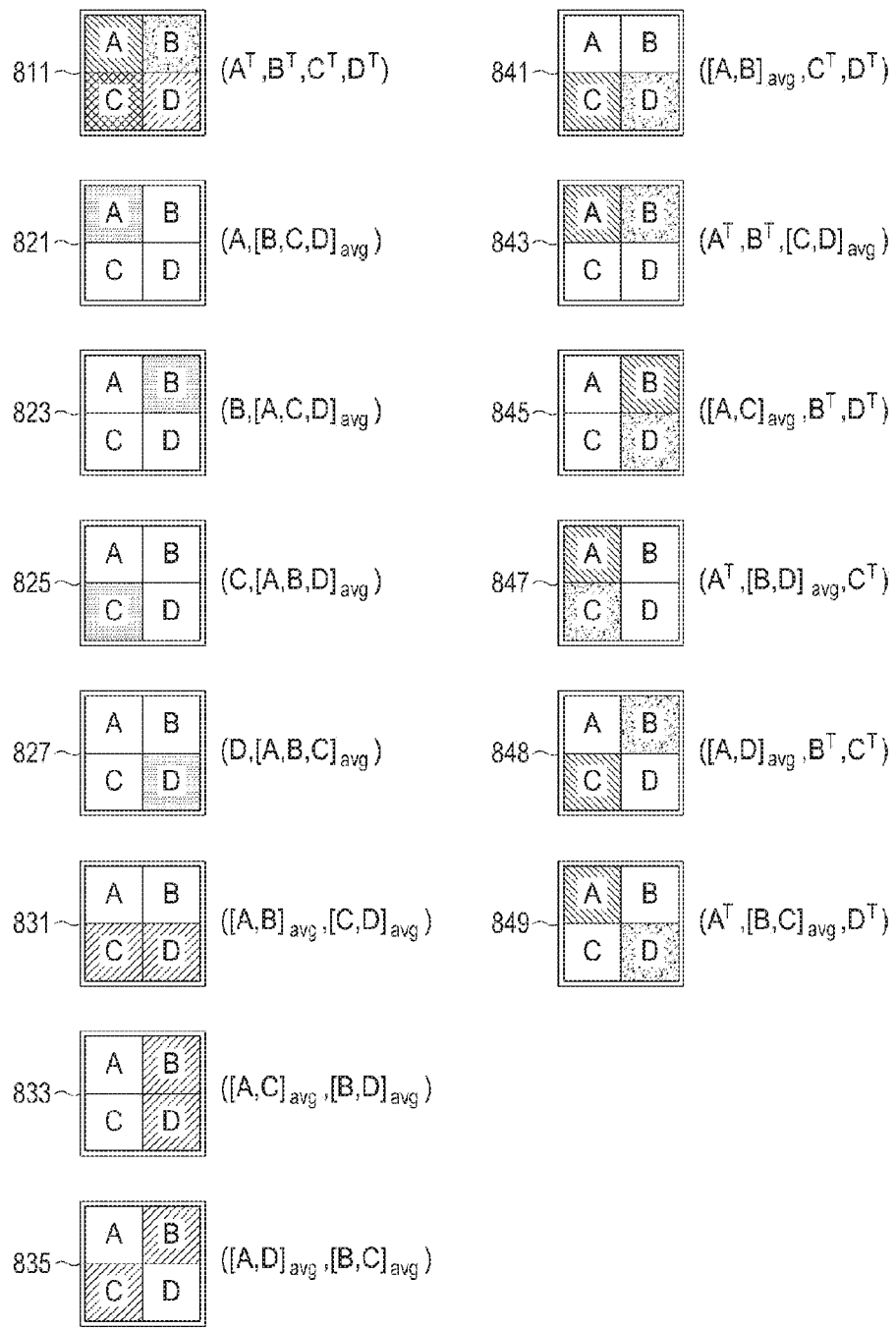
FIG. 8 illustrates a part of lossy compression modes according to embodiments of the present disclosure.

FIG. 8 illustrates a part of lossy compression modes according to embodiments of the present disclosure.

Referring to FIG. 8, an encoding module applies a unit compression scheme for a pixel in image data 610 in order to compress the image data. For example, the lossy compression modes includes a unit compression scheme which can be applied to each of pixels A, B, C, and D included in image data, and may be expressed in a form such as various patterns 811, 821, 823, 825, 827, 831, 833, 835, 841, 843, 845, 847, 848, and 849.

The unit compression scheme causes a loss of pixel data and includes, for example, truncation or average compression. The truncation compression does not exclude various changes in which some pixel data configuring the image data is omitted. The average compression does not exclude a scheme in which the plurality of pixels configuring the image data are compressed using an average value of pixel data, or a change using a part of an average value or a similar value of the average value without using an accurate average value.

Referring to FIG. 8, truncation compression for a pixel X is designated by $X^T$, and average compression for the pixel X and a pixel Y is designated by [X, Y] avg.

When a lossy compression mode corresponds to a pattern identical to a form of a mode 811, an encoding module performs the truncation compression with respect to all pixels included in the image data.

When the lossy compression mode corresponds to a pattern identical to a form of a mode 821, the encoding module calculates an average in each sub-pixel with respect to pixel data of pixels B, C, and D. That is, the encoding module calculates average pixel data which satisfies the following Equation (1):

$$[B,C,D]\text{avg}=[(Rb+Rc+Rd)/3,(Gb+Gc+Gd)/3,(Bb+Bc+Bd)/3] \quad (1)$$

In this event, the encoding module generates compression data to be included in the encoding data by connecting an average value for the pixels B, C, and D together with a pixel A included in the image data.

Various lossy compression modes shown in FIG. 8 are examples for satisfying a fixed compression ratio of 50% in current image data having a size of 96 bits. That is, the truncation compression of unit compression methods may reduce a size by 50% or acquire a compression result of a pixel size by the average compression. Therefore, the truncation compression may be a mode for satisfying the fixed compression ratio of 50% by combining the unit compression methods.

Specifically, mode 811, modes 821 to 827, modes 831 to 835, and modes 841 to 849 provide the fixed compression ratio of 50% when applying the truncation compression to four pixels, applying average compression for the remaining three pixels while maintaining one pixel value, calculating average compression between two pixels, and applying truncation compression of each of two pixels and average compression for the remaining two pixels.

Figure 9A:
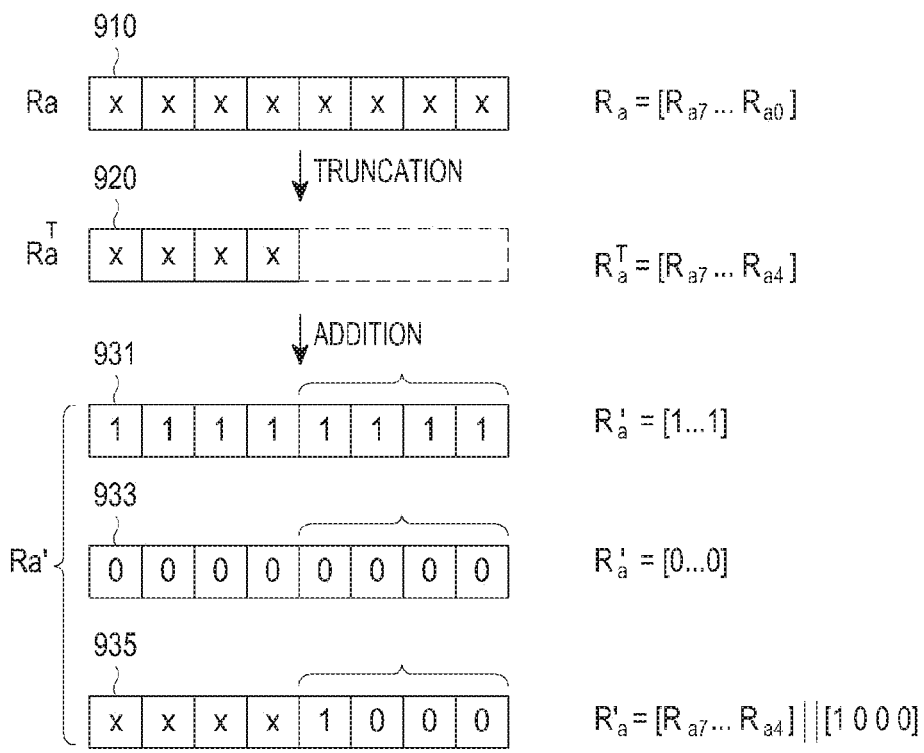
FIGS. 9A and 9B illustrate a cutting compression and reconstruction method according to embodiments of the present disclosure.
Figure 9B:
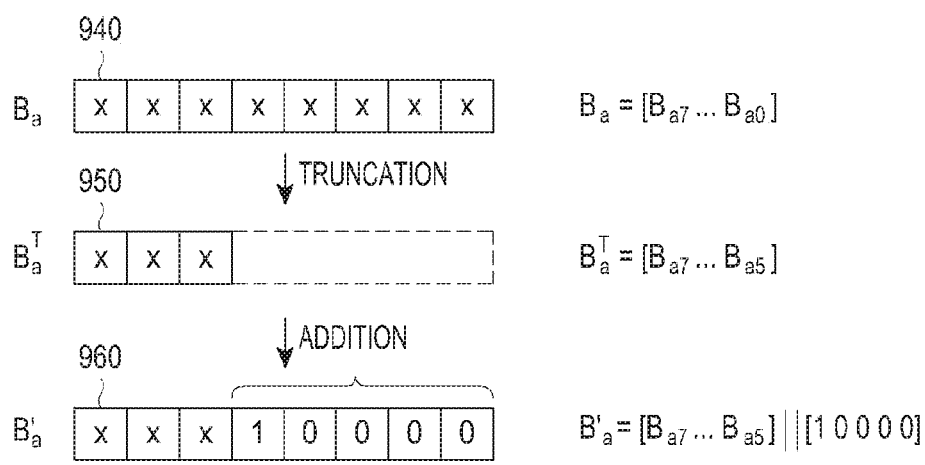

FIGS. 9A and 9B illustrate a cutting compression and reconstruction method according to embodiments of the present disclosure. Referring to FIG. 9A, sub-pixel data Ra 910 of a pixel A is expressed as [Ra7, Ra0]. According to an embodiment, when an encoding module performs truncation compression with respect to a pixel A, a part of an upper bit such as RTa=[Ra7 . . . Ra4]920 may be excluded and cut as a compression result. For example, in a truncation compression performing operation, the encoding module leaves 4 bits from a most significant bit (MSB) and abandons 4 bits from a least significant bit (LSB).

When a reconstruction operation for compressed data is performed, a reconstruction apparatus adds any data to a portion of the number such as 4 bits or 5 bits of designated bits from the cut least significant bit. For example, the reconstruction apparatus fills a 0x1000 value in a portion of the number of bits designated from the LSB while maintaining a portion of the number such as 3 bits or 4 bits of bits designated from the MSB of the truncated data. When all portions of the number of bits designated from the MSB are "1" or "0", the encoding module performs operations 931 and 933 of filling the portion of the number of bits designated from the LSB with "1" or "0" in accordance with the "1" or "0" by considering that a black and white clear contrast can be appreciated.

Referring to FIG. 9B, the encoding module performs a truncation compression for a specific sub-pixel value, leaves the number such as 3 bits of bits designated from the MSB, and abandons the remaining bits 950. In this event, for example, a blue color among the sub-pixels refers to a compression scheme of excluding the remaining bits except for upper 3 bits by the encoding module. A space of compression data which is secured according to a scheme of additionally removing a 1 bit in FIG. 9B may be used to represent a compression mode indicator (or an op code) to be included in encoding data.

The following will discuss a method in which the described selection module 413 selects a compression mode to be used for encoding.

Figure 10:
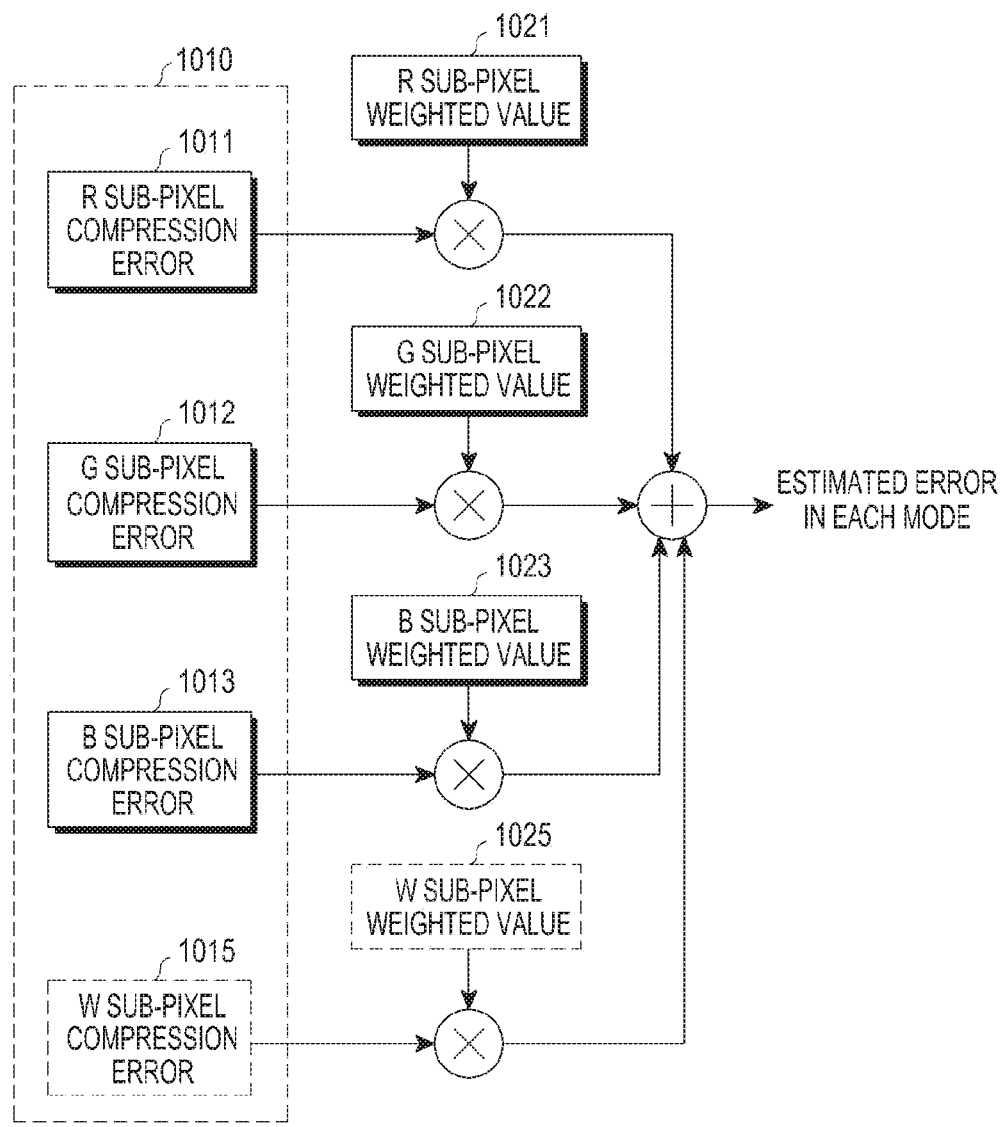
FIG. 10 illustrates a method of calculating a prediction error in each mode according to embodiments of the present disclosure.

When the image data is compressed according to a lossy compression such as visual lossless compression mode, the compression result is that truncation and/or average compression is performed from original image data. Therefore, a compression error may be generated. FIG. 10 illustrates a method of calculating a prediction error in each mode according to embodiments of the present disclosure. A technology disclosed in the present specification uses a weighted value in each sub-pixel in order to calculate an estimated error in each mode. A compression error 1010 represents a difference with first image data generated in a lossy compression mode. For example, the compression error 1010 may be a difference between pixel data included in the first image data and pixel data included in a compression result. A compression error of a specific compression mode may be calculated in each sub-pixel.

When a mode 841 in FIG. 8 is described as an example, a compression result or a compression estimated result according to the mode 841 is [A, B]avg, CT, DT, and a compression error by the mode 841, that is, a compression error AERR, BERR, CERR or DERR in each pixel by comparing each pixel included in the image data as shown below, which will be referred to as Equation (2) for convenience.

$AERR = \text{pixel } A[Ra,Ga,Ba,Wa] - [A,B]\text{avg}$ $BERR = \text{pixel } B[Rb,Gb,Bb,Wb] - [A,B]\text{avg}$ $CERR = \text{pixel } C[Rc,Gc,Bc,Wc] - CT$ $DERR = \text{pixel } D[Rd,Gd,Bd,Wd] - DT$ (2)

The compression error is divided into an element in each sub-pixel in order to calculate an estimated error in each a compression mode applying a weighted value in each sub-pixel. When this refers to an estimated error in each sub-pixel, the estimated error in each sub-pixel is calculated as shown below, which will be referred to as Equation (3) for convenience.

$R$ sub-pixel compression error (1011)$=RA\text{ERR}+RB\text{ERR}+RC\text{ERR}+RD\text{ERR}$ $G$ sub-pixel compression error (1012)$=GA\text{ERR}+GB\text{ERR}+GC\text{ERR}+GD\text{ERR}$ $B$ sub-pixel compression error (1013)$=BA\text{ERR}+BB\text{ERR}+BC\text{ERR}+BD\text{ERR}$ $W$ sub-pixel compression error (1015)$=WA\text{ERR}+WB\text{ERR}+WC\text{ERR}+WD\text{ERR}$ Hereinafter, when the weighted value in each sub-pixel refers to R weight 1021, G weight 1022, B weight 1023, and W weight 1025, respectively, the weighted value is multiplied by each sub-pixel compression error and then the multiplied value are added, thereby calculating an estimated error in each mode.

In embodiments of the present disclosure, when the lossy compression is unavoidable, a weighted value considering a characteristic of a human's eye for a color or brightness in each sub-pixel is applied in each sub-pixel to provide an image data compression having little or no visual loss. By considering a characteristic of the human eye in which sensitivity for brightness is high, a weighted value for a sub-pixel such as a green or white pixel, in which a proportion of visual brightness is high, among the weighted values in each pixel may be designated as a value larger than another sub-pixel such as a red or blue sub-pixel. According to an embodiment, the weighted value in each sub-pixel may be R:G:B=2:5:1 or 3:6:1. A ratio of the weighted value in each sub-pixel described above is only an example, and it is not limited thereto.

A selection module selects one mode among the compression modes based on each mode estimated error, to which the weighted value is applied, among a plurality of compression modes with respect to current image data. For example, the selection module 413 selects a mode in which the mode estimated error is the smallest as the compression mode.

Figure 11:
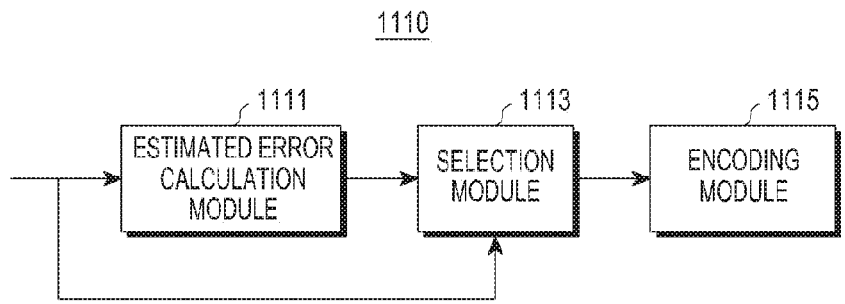
FIG. 11 is a block diagram illustrating a compression apparatus according to embodiments of the present disclosure.

FIG. 11 is a block diagram illustrating a compression apparatus according to embodiments of the present disclosure. Referring to FIG. 11, a compression apparatus 1110 has a feature of compressing image data by considering a lossless compression mode in comparison with the compression apparatus 410 in FIG. 4.

According to an embodiment, a selection module 1113 determines whether the lossless compression mode can be applied based on image data. As a result of the determination, when the compression apparatus 1110 can use one mode among the lossless compression modes, the selection module 1113 selects one mode among the lossless compression modes without considering calculation of an estimated error of lossy compression modes of an estimated error calculation module 1111. An encoding module 1115 encodes the image data according to a compression scheme of a corresponding mode among a lossless compression mode or lossy compression mode which the selection module 1113 selects.

Figure 12:
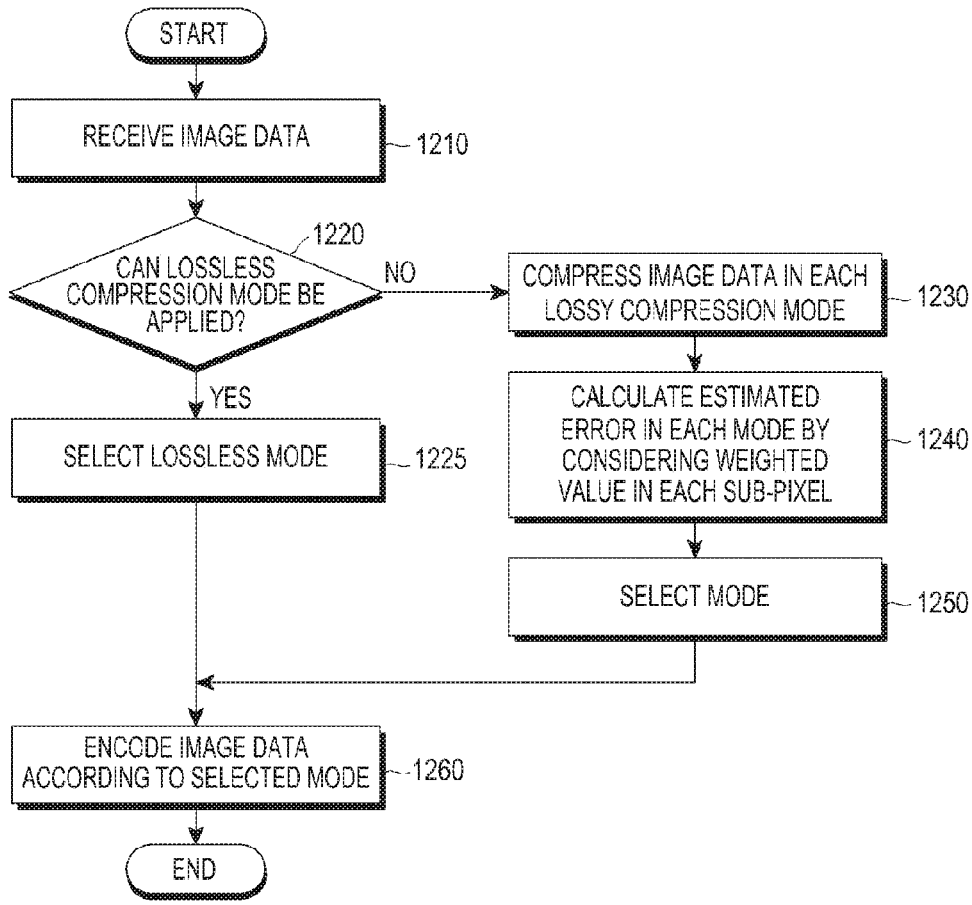
FIG. 12 is another flowchart illustrating an image data compression method by considering a lossless compression mode according to embodiments of the present disclosure.

FIG. 12 illustrates an image data compression method by considering a lossless compression mode according to embodiments of the present disclosure.

In step 1210, a compression apparatus receives image data as an input.

In step 1220, the compression apparatus determines whether the image data uses a lossless compression mode based on the image data. In step 1225, when it is determined that the compression apparatus can use the lossless compression mode, one mode among a plurality of lossless compression modes is selected. The compression apparatus selects one mode among the plurality of lossless compression modes based on a pattern of the image data.

In step 1230, when it is determined that the compression apparatus cannot use the lossless compression mode, a compression error of the image data is calculated according to each of the plurality of lossy compression modes. In step 1240, the compression apparatus calculates an estimated error of each of the modes based on a compression error of each of the modes and the weighted value in each sub-pixel. In step 1250, the compression apparatus selects a mode among the modes based on the estimated error in each of the modes.

In step 1260, the compression apparatus performs encoding the image data using the selected mode. The compression apparatus performs an encoding operation according to the lossless compression mode when one mode among the lossless compression modes is selected based on the determination of the step 1220. In other cases, the compression apparatus performs the encoding operation according to one mode among the lossy compression modes as a result of the selection result in step 1250.

Hereinafter, a compression method based on a plurality of lossless compression modes according to embodiments is disclosed. For example, a compression apparatus 1110 in FIG. 11 may determine whether a lossless compression mode can be applied based on a pattern of a pixel value included in image data.

Figure 13:
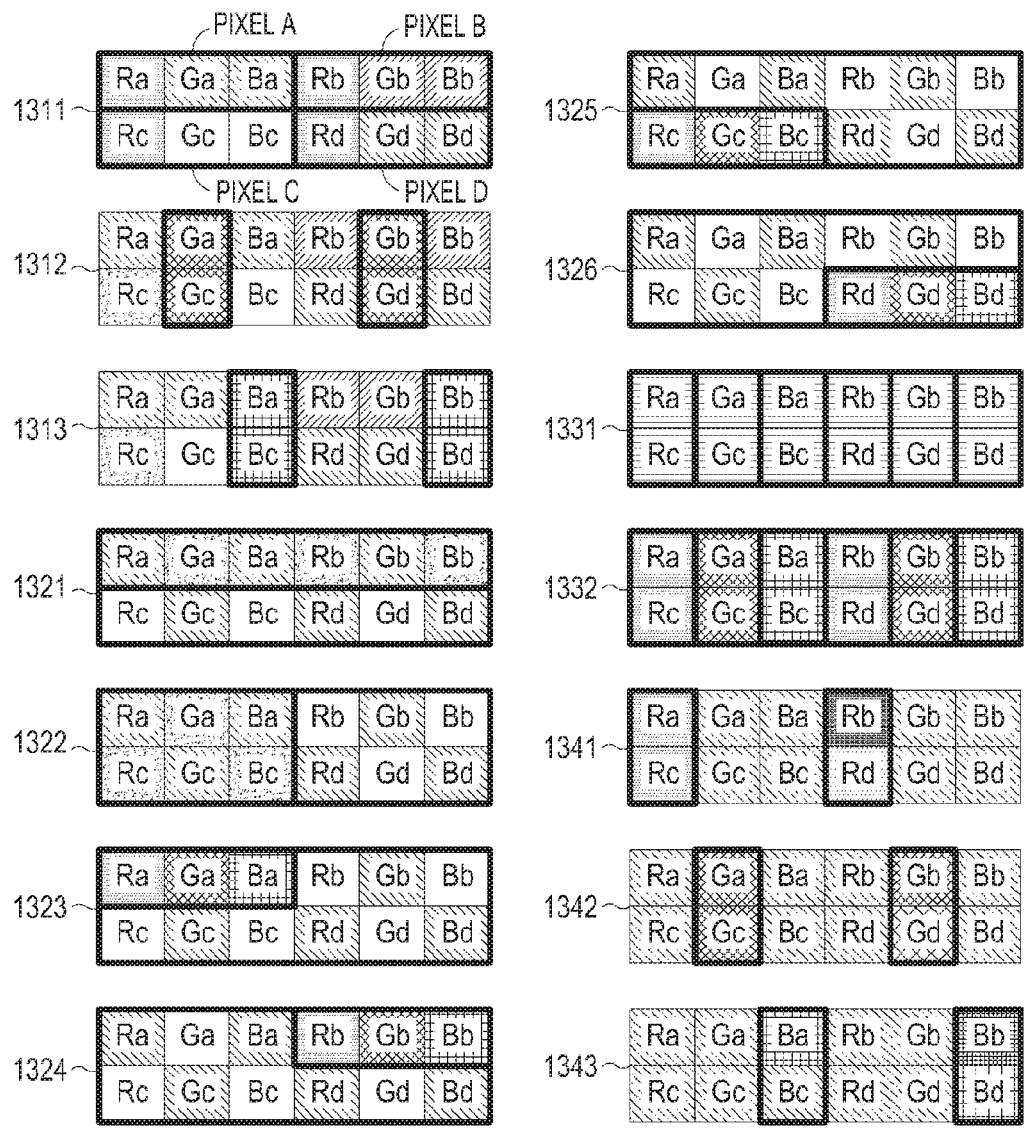
FIG. 13 illustrates a compression pattern representing a lossless compression mode according to embodiments of the present disclosure.

FIG. 13 illustrates a compression pattern representing a lossless compression mode according to embodiments of the present disclosure. The compression pattern represents an assignment of a pixel value in the image data, and when values of sub-pixels included in the image data are equally repeated, the compression pattern is represented by considering a repeats form.

When a sub-pixel value in image data to be compressed is repeated as an identical value according to various patterns, a compression apparatus generates encoding data while omitting overlapping sub-pixels.

Referring to FIG. 13, image data includes pixels A, B, C, and D which have a size of 24 bits, respectively. Therefore, the image data has a total size of 96 bits. Each of the pixels has a size of 8 bits, and is configured by values of sub-pixels corresponding to R, G, and B. That is, the sub-pixels are displayed as Ra, Ga, Ba in a pixel A, as Rb, Gb, Bb in a pixel B, as Rc, Gc, Bc in a pixel C, and as Rd, Gd, Bd in a pixel D.

For example, in pattern 1311, values of four R sub-pixels are identical and values of G and B sub-pixels in each pixel are equal to each other, that is, Ra=Rb=Rc=Rd, Ga=Ba, Gb=Bb, Gc=Bc, and Gd=Bd are satisfied. In this event, the compression apparatus generates an indicator or an op code including identification information on the pattern 1311 and different sub-pixel values Ra, Ga, Gb, Gc and Gd, and generate encoding data based on the op code and the compression data to transmit the encoding data to a reconstruction apparatus. A reconstruction apparatus receiving the encoding data recognizes a form of a pattern as described above based on identification information on the pattern to reconstruct original image data using five sub-pixel values in the encoding data.

In pattern 1312, values of four G sub-pixels are identical and values of R and B sub-pixels in each pixel are equal to each other, that is, Ga=Gb=Gc=Gd, Ra=Ba, Rb=Bb, Rc=Bc, and Rd=Bd are satisfied. In pattern 1313, values of four B sub-pixels are same and values of R and G sub-pixels in each pixel are equal to each other.

In pattern 1321, three sub-pixels are equal to each other, such as Ra=Ba=Gb, Ga=Rb=Bb, Rc=Bc=Gd, and Gc=Rd=Bd. In pattern 1322, three sub-pixels are equal to each other, such as Ra=Ba=Gc, Ga=Rc=Bc, Rb=Gd=Bb, and Rd=Gb=Bd. In patterns 1323 to 1326, one pixel is different and the remaining three pixels have a repeated form.

In pattern 1331, four sub-pixels are different, but satisfy Ra=Ga=Ba, Rb=Gb=Bb, Rc=Gc=Bc, and Rd=Gd=Bd. In pattern 1332, values of R, G, B sub-pixels in each pixel are identical. In pattern 1341, values of R sub-pixels in each pixel are different and all G and B sub-pixels in each pixel are identical. In pattern 1342, values of G sub-pixels in each pixel are different and all R and B sub-pixels in each pixel are identical. In pattern 1343, values of B sub-pixels in each pixel are different and all R and G sub-pixels in each pixel are identical.

Figure 14A:
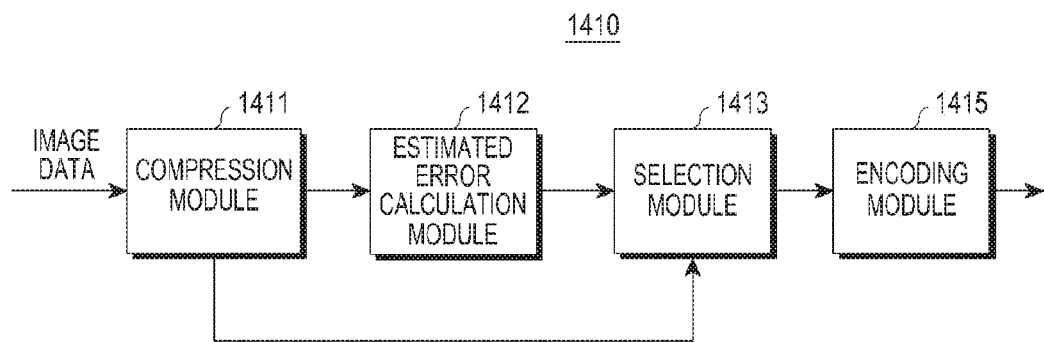
FIGS. 14A and 14B illustrate a configuration of an image data compression apparatus according to embodiments of the present disclosure.
Figure 14B:
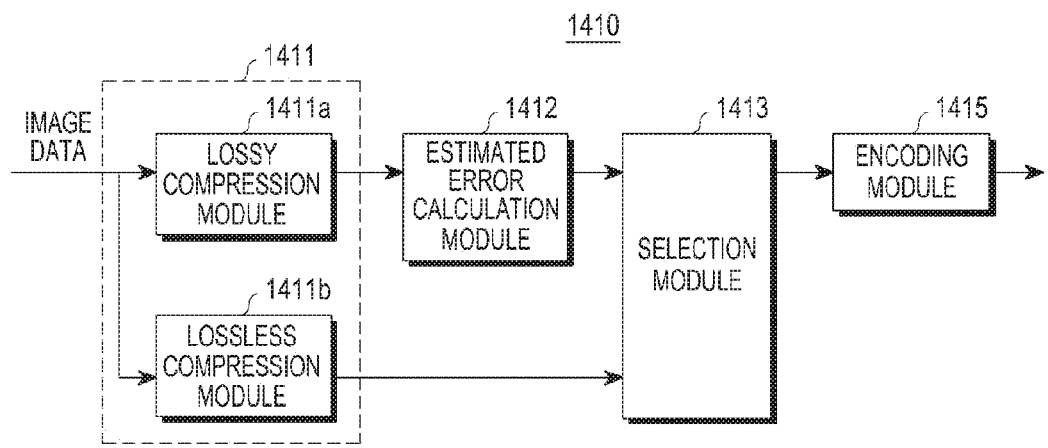

FIGS. 14A and 14B illustrate a configuration of an image data compression apparatus according to embodiments of the present disclosure. A compression apparatus 1410 includes a compression module 1411, an estimated error calculation module 1412, a selection module 1413, and an encoding module 1415. Hereinafter, the compression apparatus 1410 shown in FIGS. 14A and 14B will be described except for a part identical to the compression apparatus 410 as shown in FIG. 4, which description will be omitted for conciseness.

The compression module 1411 compresses image data according to each of a plurality of compression modes. The estimated compression error calculation module 1412 calculates a compression error of each of the modes based on a result compressed by the compression module 1411 and the image data, and calculates an estimated error of each of the plurality of modes based on the compression error of each of the modes and a weighted value in each sub-pixel. The selection module 1413 selects one mode among the plurality of modes based on the estimated error of each of the plurality of modes. The encoding module 1415 encodes the image data compressed according to a mode selected by the selection module 1413.

Referring to FIG. 14B, the compression module 1411 includes at least one among a lossy compression module 1411a comprising the image data according to a plurality of lossy compression modes, and a lossless compression module 1411b compressing the image data according to a plurality of lossless compression modes. The estimated error calculation module 1412 calculates a compression error in each lossy compression mode based on a compression result in each lossy mode generated by the lossy compression module 1411a and the image data, and calculates an estimated error of each lossy mode based on the compression error of each mode and a weighted value in each sub-pixel. The lossless compression module 1411b compresses the image data according to each of the plurality of compression modes as described above. The selection module 1413 determines whether the lossless compression mode can be applied to the input image data, and when the lossless compression mode can be applied as a result of the determination, selects one mode among the lossless compression modes based on a pattern of pixel data included in the image data, and selects one mode among the lossy compression modes based on an estimated error in each mode received from the estimated error calculation module 1412 in another instance of the result of the determination. The encoding module 1415 encodes the image data compressed according to a mode selected by the selection module 1413.

Figure 15:
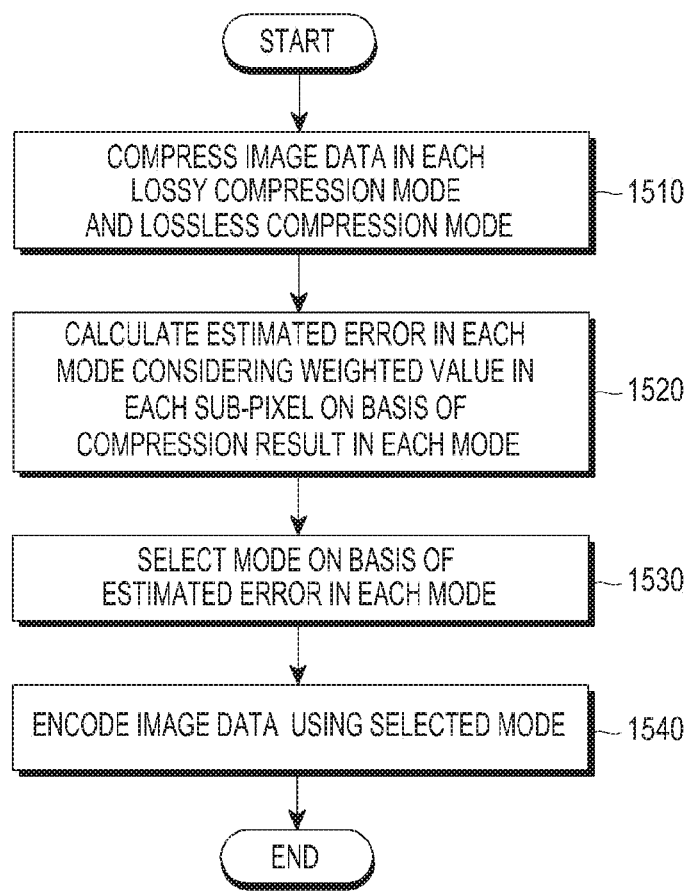
FIG. 15 illustrates an image data compression method by considering a lossless compression mode according to embodiments of the present disclosure.

FIG. 15 illustrates an image data compression method by considering a lossless compression mode according to embodiments of the present disclosure. A specific description identical to the content described above is omitted.

In step 1510, a compression apparatus receives image data as an input and compresses the image data according to each of a plurality of compression modes for compressing the image data. The plurality of compression modes includes a plurality of lossy compression modes and lossless compression modes. Compressing the image data according to the compression modes may simultaneously or sequentially proceed with respect to an entire compression mode.

In step 1520, the compression apparatus calculates an estimated error of each of the modes based on a compression error of each of the modes and the weighted value in each sub-pixel. If a lossless compression mode can be applied to an arrangement of sub-pixels included in the image data, the lossless compression mode may have no errors or fewer estimated errors than other compression modes.

In step 1530, the compression apparatus selects a mode among the modes based on the estimated error in each mode. In this event, even the lossless compression mode may be determined to be identical to a general mode.

In step 1540, the compression apparatus performs encoding the image data by using the selected mode.

Figure 16:
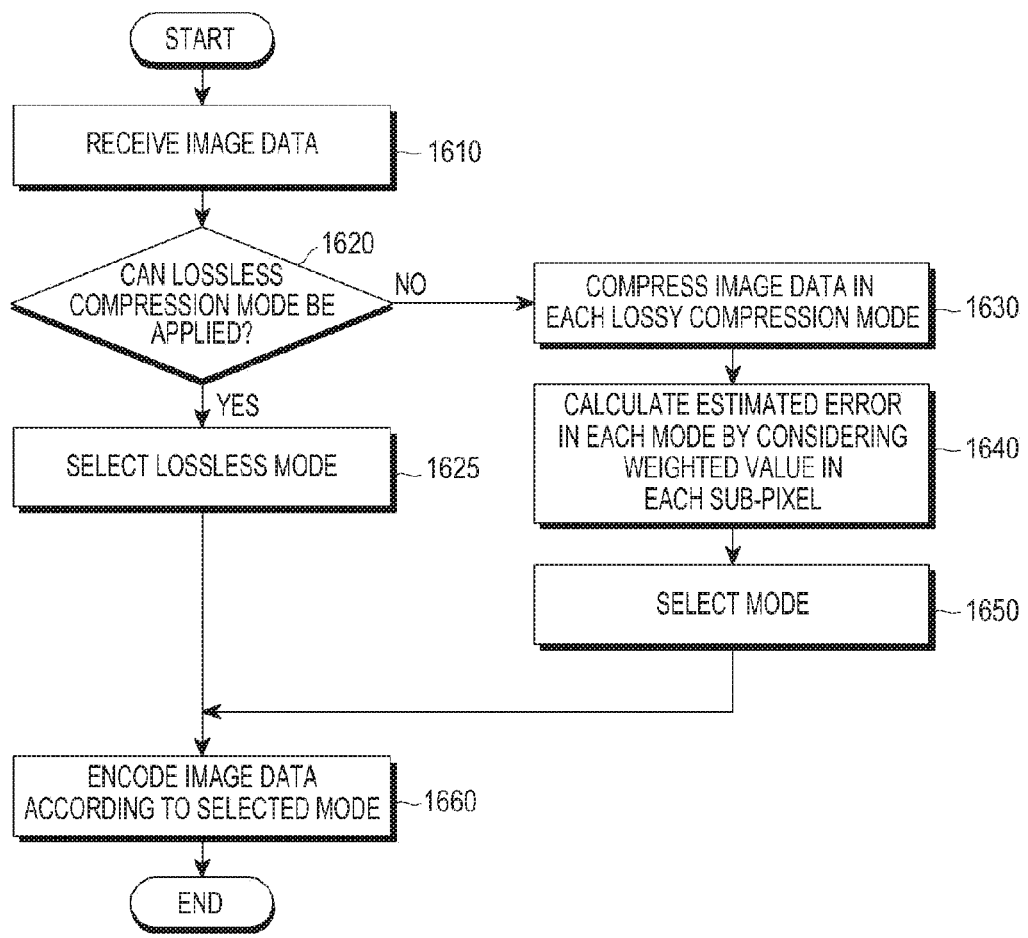
FIG. 16 illustrates an image data compression method by considering a lossless compression mode according to embodiments of the present disclosure.

FIG. 16 illustrates an image data compression method by considering a lossless compression mode according to embodiments. A specific description identical to the content described above is omitted for conciseness.

In step 1610, a compression apparatus receives image data as an input.

In step 1620, the compression apparatus determines whether a mode among one or more lossless compression modes for compressing the image data is applied. In step 1625, the compression apparatus selects one mode among the lossless compression modes when it is determined that a lossless compression mode can be applied.

In step 1630, the compression apparatus calculates a compression error of the image data according to each of a plurality of lossy compression modes for compressing the image data when it is determined that a lossless compression mode cannot be applied. In step 1640, the compression apparatus calculates an estimated error of each of the lossy compression modes based on the compression error and the weighted value in each sub-pixel. In step 1650, the compression apparatus selects a mode among the lossy compression modes based on the estimated error in each of the lossy compression modes.

In step 1660, the compression apparatus encodes the image data according to the selected mode.

Figure 17:
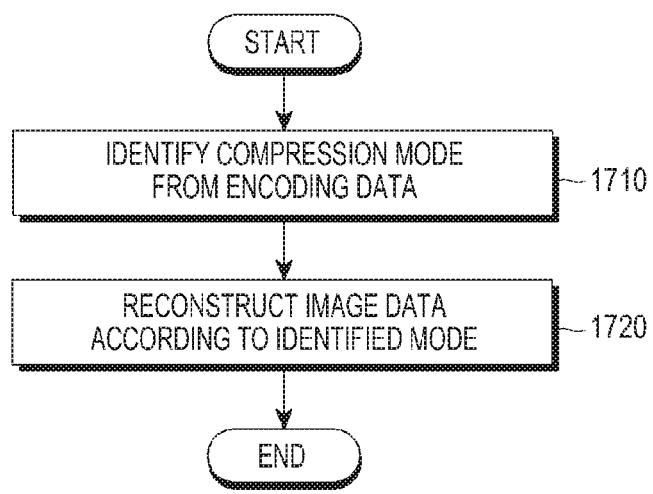
FIG. 17 illustrates a reconstruction apparatus according to embodiments of the present disclosure.

FIG. 17 illustrates a reconstruction apparatus according to embodiments of the present disclosure. A specific description identical to the content described above is omitted for conciseness.

In step 1710, a reconstruction apparatus identifies a compression mode of image data included in the encoding data based on the encoding data.

In step 1720, the reconstruction apparatus reconstructs the image data from the encoding data according to the identified mode.

Embodiments disclosed herein are provided merely to describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure. Although certain embodiments are described herein, it will be understood by those skilled in the art that various changes in form and detail may be made therein without departing from the spirit and scope of the embodiments, as defined by the appended claims.

What is claimed is:

1. An image data compression method comprising:
   calculating an estimated error of each of a plurality of compression modes for compressing image data based on the image data and a weighted value in each sub-pixel;
   selecting one mode among the plurality of compression modes based on the estimated error of each of the plurality of compression modes; and
   encoding the image data according to the selected mode.

2. The image data compression method of claim 1, wherein encoding the image data comprises truncating at least a part of a pixel value included in the image data.

3. The image data compression method of claim 1, wherein encoding the image data comprises replacing at least a part of pixel values included in the image data with another value.

4. The image data compression method of claim 3, wherein replacing the at least part of the pixel values is based on an average of the at least part of the pixel values.

5. The image data compression method of claim 1, further comprising calculating a compression error of each of the plurality of compression modes based on a difference value between a compression estimation result of the image data and the image data,
   wherein the estimated error of each of the plurality of compression modes is calculated by applying a weighted value of each sub-pixel to the compression error.

6. The image data compression method of claim 1, wherein the selected mode has a smallest value of the estimated error of each of the plurality of compression modes.

7. The image data compression method of claim 1, wherein encoding the image data comprises encoding compressed image data to have a fixed compression ratio in comparison with a size of the image data.

8. The image data compression method of claim 7, wherein the fixed compression ratio corresponds to 33%, 50%, or 75%.

9. The image data compression method of claim 7, wherein encoding the image data comprises encoding the image data having a size of 96 bits into image data having a size of 48 bits.

10. The image data compression method of claim 1, wherein the image data is compressed based on a unit compression method in each of the plurality of pixels included in the image data.

11. The image data compression method of claim 10, wherein the unit compression method includes truncation compression or average compression.

12. The image data compression method of claim 1, wherein the image data includes a plurality of pixel values belonging to an adjacent row within the image.

13. The image data compression method of claim 1, further comprising:
   determining whether one mode among a plurality of lossless compression modes can be applied to the image data; and
   selecting one mode among the lossless compression modes when determining that one mode among the plurality of lossless compression modes can be applied to the image data.

14. The image data compression method of claim 13, wherein whether one mode among the plurality of lossless compression modes can be applied to the image data is determined based on the number of pixels having identical values in a plurality of pieces of pixel data in the image data.

15. The image data compression method of claim 13, wherein whether one mode among the plurality of lossless compression modes can be applied to the image data is determined based on a pattern of pixel data included in the image data.

16. The image data compression method of claim 15, wherein the pattern of the pixel data represents whether values corresponding to at least a part of a specific sub-pixel of the pixel data are identical, whether there is a sub-pixel having identical values among the plurality of pieces of pixel data, or whether sub-pixel values of the plurality of pixels are repeated without a type of sub-pixel values of the plurality of the pixels.

17. The image data compression method of claim 1, wherein the sub-pixel is classified into values of red (R), green (G), and blue (B), and in the weighted value in each sub-pixel, the value of G is larger than the values of R and B.

18. An image data reconstruction method comprising:
   identifying a compression mode, used for compressing image data, included in encoded data based on the encoded data; and
   reconstructing the image data from the encoded data according to the identified compression mode,
   wherein the compression mode is selected based on an estimated error of the compression mode, and
   wherein the estimated error of the compression mode is calculated based on the image data and a weighted value in each sub-pixel.

19. The image data reconstruction method of claim 18, wherein reconstructing the image data comprises restoring pixel values in which at least a part of the pixel values is truncated according to the identified mode.

20. The image data reconstruction method of claim 19, wherein restoring the value of the truncated pixel comprises copying a pixel value corresponding to an upper bit to a lower bit or filling the pixel value corresponding to the upper bit with a specific bit.

21. The image data reconstruction method of claim 18, wherein reconstructing the image data comprises copying a replacement pixel value included in at least a part of the encoded data as a pixel value of the image data according to the identified mode.

22. The image data reconstruction method of claim 18, wherein the image data is reconstructed from the encoded data with a fixed compression ratio.

23. The image data reconstruction method of claim 22, wherein the fixed compression ratio corresponds to 33%, 50%, or 75%.

24. The image data reconstruction method of claim 22, wherein reconstructing the image data comprises reconstructing the image data having a size of 48 bits into image data having a size of 96 bits.

25. The image data reconstruction method of claim 18, wherein the encoded data is reconstructed as image data for pixels belonging to a plurality of rows in the image.

26. An image data compression apparatus comprising:
   a memory configured to store programs; and
   one or more processors configured to:
     determine whether one mode among one or more lossless compression modes for compressing image data can be applied;
     select the one mode among the lossless compression modes when determining that the one mode among the plurality of lossless compression modes can be applied;
     calculate a compression error of the image data according to each of a plurality of lossy compression modes for compressing the image data when determining that one mode among the plurality of lossless compression modes cannot be applied;
     calculate an estimated error of each of the lossy compression modes based on the compression error and a weighted value in each sub-pixel;
     select one mode among the lossy compression modes based on the estimated error of each of the lossy compression modes; and
     encode the image data according to the selected mode.

27. An image data compression apparatus, comprising:
   a memory configured to store programs; and
   one or more processors configured to:
     calculate an estimated error of each of a plurality of compression modes for compressing image data based on the image data and a weighted value in each sub-pixel;
     select a mode among the plurality of compression modes based on the estimated error of each of the plurality of compression modes; and
     encode the image data according to the selected mode.

28. The image data compression apparatus of claim 27, wherein the one or more processors are further configured to:
   truncate at least a part of a pixel value included in the image data.

29. The image data compression apparatus of claim 27, wherein the one or more processors are further configured to:
replace at least a part of pixel values included in the image data with another value.

30. The image data compression apparatus of claim 29, wherein the at least part of the pixel values is replaced based on an average of the at least part of the pixel values.

31. The image data compression apparatus of claim 27, wherein the one or more processors are further configured to:
calculate a compression error of each of the plurality of compression modes based on a difference value between a compression estimation result of the image data and the image data,
wherein the estimated error of each of the plurality of compression modes is calculated by applying a weighted value of each sub-pixel to the compression error.

32. The image data compression apparatus of claim 27, wherein the selected mode has a smallest value of the estimated error of each of the plurality of compression modes.

33. The image data compression apparatus of claim 27, wherein the one or more processors are further configured to:
encode compressed image data to have a fixed compression ratio in comparison with a size of the image data.

34. The image data compression apparatus of claim 33, wherein the fixed compression ratio corresponds to 33%, 50%, or 75%.

35. The image data compression apparatus of claim 33, wherein the one or more processors are further configured to:
encode the image data having a size of 96 bits into image data having a size of 48 bits.

36. The image data compression apparatus of claim 27, wherein the image data is compressed based on a unit compression method in each of the plurality of pixels included in the image data.

37. The image data compression apparatus of claim 36, wherein the unit compression method includes truncation compression or average compression.

38. The image data compression apparatus of claim 27, wherein the image data includes a plurality of pixel values belonging to an adjacent row within the image.

39. The image data compression apparatus of claim 27, wherein the one or more processors are further configured to:
determine whether one mode among a plurality of lossless compression modes can be applied to the image data; and
select the one mode among the lossless compression modes when determining that one mode among the plurality of lossless compression modes can be applied to the image data.

40. The image data compression apparatus of claim 39, wherein whether the one mode among the plurality of lossless compression modes can be applied to the image data is determined based on a number of pixels having identical values in a plurality of pieces of pixel data in the image data.

41. The image data compression apparatus of claim 39, wherein whether the one mode among the plurality of lossless compression modes can be applied to the image data is determined based on a pattern of pixel data included in the image data.

42. The image data compression apparatus of claim 41, wherein the pattern of the pixel data represents whether values corresponding to at least a part of a specific sub-pixel of the pixel data are identical, whether there is a sub-pixel having identical values among the plurality of pieces of pixel data, or whether sub-pixel values of the plurality of pixels are repeated without a type of sub-pixel values of the plurality of the pixels.

43. The image data compression apparatus of claim 27, wherein each of the sub-pixels is classified into values of red (R), green (G), and blue (B), and in the weighted value in each sub-pixel, the value of G is larger than the values of R and B.

44. An image data reconstruction apparatus, comprising:
a memory configured to store programs; and
one or more processors configured to:
identify a compression mode, used for compressing image data, included in encoded data based on the encoded data; and
reconstruct the image data from the encoded data according to the identified compression mode,
wherein the compression mode is selected based on an estimated error of the compression mode, and
wherein the estimated error of the compression mode is calculated based on the image data and a weighted value in each sub-pixel.

45. The image data reconstruction apparatus of claim 44, wherein the one or more processors are further configured to:
restore pixel values in which at least a part of the pixel values is truncated according to the identified compression mode.

46. The image data reconstruction apparatus of claim 45, wherein the one or more processors are further configured to:
copy a pixel value corresponding to an upper bit to a lower bit or fill the pixel value corresponding to the upper bit with a specific bit.

47. The image data reconstruction apparatus of claim 44, wherein the one or more processors are further configured to:
copy a replacement pixel value included in at least a part of the encoded data as a pixel value of the image data according to the identified mode.

48. The image data reconstruction apparatus of claim 44, wherein the image data is reconstructed from the encoded data with a fixed compression ratio.

49. The image data reconstruction apparatus of claim 48, wherein the fixed compression ratio corresponds to 33%, 50%, or 75%.

50. The image data reconstruction apparatus of claim 48, wherein reconstructing the image data comprises reconstructing the image data having a size of 48 bits into image data having a size of 96 bits.

51. The image data reconstruction apparatus of claim 44, wherein the encoded data is reconstructed as image data for pixels belonging to a plurality of rows in the image.

* * * * *